United States Patent
Ha et al.

(10) Patent No.: US 12,164,307 B2
(45) Date of Patent: Dec. 10, 2024

(54) METHOD FOR INTERLINKING HETEROGENEOUS FLEET SYSTEMS, DEVICE AND SYSTEM IMPLEMENTING THE SAME

(71) Applicants: HYUNDAI MOTOR COMPANY, Seoul (KR); KIA CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 158 days.

(21) Appl. No.: 17/408,785

(22) Filed: Aug. 23, 2021

(65) Prior Publication Data
US 2022/0057810 A1   Feb. 24, 2022

(30) Foreign Application Priority Data

Aug. 24, 2020 (KR) .................. 10-2020-0106498
Jun. 18, 2021 (KR) .................. 10-2021-0079052

(51) Int. Cl.
| | |
|---|---|
| G05D 1/00 | (2024.01) |
| G01C 21/34 | (2006.01) |
| G01C 21/36 | (2006.01) |
| G06Q 50/40 | (2024.01) |
| G08G 1/00 | (2006.01) |

(52) U.S. Cl.
CPC ....... *G05D 1/0291* (2013.01); *G01C 21/3407* (2013.01); *G01C 21/3484* (2013.01); *G01C 21/3605* (2013.01); *G06Q 50/40* (2024.01); *G08G 1/202* (2013.01)

(58) Field of Classification Search
None
See application file for complete search history.

(56) References Cited

U.S. PATENT DOCUMENTS

| | | | |
|---|---|---|---|
| 2010/0257105 A1* | 10/2010 | Wurster | G06Q 20/102 705/5 |
| 2017/0069016 A1* | 3/2017 | Rackley | G06Q 30/0645 |
| 2018/0211337 A1* | 7/2018 | Ghaddar | G06Q 50/14 |
| 2019/0376805 A1* | 12/2019 | Whitt | B60R 25/245 |
| 2020/0258009 A1* | 8/2020 | Colon | G06Q 10/1095 |
| 2020/0351192 A1* | 11/2020 | Murao | H04L 45/74 |

* cited by examiner

*Primary Examiner* — Tuan C To
*Assistant Examiner* — David Ruben Pedersen
(74) *Attorney, Agent, or Firm* — MORGAN, LEWIS & BOCKIUS LLP

(57) ABSTRACT

A method for interlinking heterogeneous fleet systems implemented by a computing device includes: receiving a use request for a moving object from a user device belonging to a first fleet system; transmitting a use inquiry message to a second fleet system when the use request includes a use of a moving object the second fleet system; transmitting a second available moving object list corresponding to the use inquiry message to the first fleet system when the second fleet system permits the moving object to be used; and transmitting to the user device with a final moving object list including a moving object that belongs to at least one of the second available moving object list or a first available moving object list in the first fleet system according to the use request.

18 Claims, 15 Drawing Sheets

FIG. 9

| USER | USE STATUS INFORMATION | | EVALUATION INFORMATION | RATING LEVEL |
|---|---|---|---|---|
| | TERM OF CONTRACT (MONTH) | USE PERFORMANCE (HOUR) | | |
| a | 6 | 70 | intermediate | B |
| b | 12 | 80 | excellent | A |
| c | 24 | 160 | excellent | S |
| d | 6 | 55 | intermediate | C |
| e | 18 | 90 | top | A |
| ⋮ | ⋮ | ⋮ | ⋮ | ⋮ |

| RATING LEVEL | VEHICLE SPECIFICATION | MODEL YEAR (YEAR; RECOMMENDED) | CLEANLINESS (RECOMMENDED) | USE OF MOVING OBJECT OF ANOTHER FLEET | USE REGION RANGE OF MOVING OBJECT OF ANOTHER FLEET | RETURN TO ANOTHER FLEET SPOT | MINIMUM CHARGE OF USE | PENALTY |
|---|---|---|---|---|---|---|---|---|
| S | top~low | 1~2 | A++ | possible | unlimited | possible | applicable | exempt |
| A | high~low | 2~4 | A+ | possible | unlimited | possible | inapplicable | exempt |
| B | middle~low | 3~5 | A | possible | limited | impossible | inapplicable | applicable |
| C | low | 4~6 | B | impossible | N/A | N/A | N/A | applicable |

* Recommendation: Basically applied when there is a vehicle corresponding to the item.
  Check and present lower items in sequence when no corresponding item exists.
* In case a heterogeneous fleet system does not permit, use range and return may be limited.

FIG. 10

METHOD FOR INTERLINKING HETEROGENEOUS FLEET SYSTEMS, DEVICE AND SYSTEM IMPLEMENTING THE SAME

CROSS REFERENCE TO RELATED APPLICATION

The present application claims the benefit of priority to Korean patent applications Nos. 10-2020-0106498, filed on Aug. 24, 2020, and 10-2021-0079052, filed on Jun. 18, 2021, the entire contents of which are incorporated herein by reference.

TECHNICAL FIELD

The present disclosure relates to a method, device and system for interlinking heterogeneous fleet systems that are implemented by a computing device, and more particularly to a method, device and system for interlinking heterogeneous fleet systems implemented by a computing device so that a shared moving object may be provided by a different fleet system to which a user device is not registered.

BACKGROUND

Along with technical advances, the notion of car ownership is being weakened, while the use of shared cars is on the rise. Specifically, for the convenience of everyday life in a particular region or residence, the needs for shared vehicles and related services are increasing. For the smooth use of shared moving objects in an area crowded with users, many moving objects may be kept and managed near the crowded area.

The conventional system, which operates a shared moving object system through a computing device, distributes and manages a small number of shared moving objects at many points.

Recently, as the concept of smart city emerges, a platform is being developed for providing a convenient service of a facility and a public thing to people who stay mainly in a specific region. For example, a public thing may be a shared moving object, and in order to build an eco-friendly city, residents of a smart city are encouraged to use a shared moving object instead of their own moving objects. Accordingly, a system operating a platform should manage a larger number of shared moving objects than before and for the purpose of efficient management, may operate the platform so that moving objects are concentrated in a region with many residents. As the number of residents and the number of shared moving objects increase, an area for storing shared moving objects becomes wider necessarily. It becomes more necessary for a platform system to allocate shared moving objects, which are dispersed over a large area, so that the moving objects may not be concentrated among zones, and to manage the moving objects in good condition.

Meanwhile, there may be multiple fleet systems managing a sharing service of moving objects. In addition, although a user uses a moving object within one fleet system in most cases, using or returning a moving object between fleet systems different from each other (hereinafter, referred to as "heterogeneous fleet system") may be required as necessary. However, neither algorithm nor method for interlinked data processing between fleet systems has been implemented to address the demand.

The information disclosed in the Background section above is to aid in the understanding of the background of the present disclosure, and should not be taken as acknowledgement that this information forms any part of prior art.

SUMMARY

A technical object of the present disclosure is to provide a method, device and system for interlinking heterogeneous fleet systems implemented by a computing device so that a shared moving object may be provided by a different fleet system to which a user device is not registered.

The technical objects of the present disclosure are not limited to the above-mentioned technical objects, and other technical objects that are not mentioned will be clearly understood by those skilled in the art through the following descriptions.

According to an aspect of the present disclosure, a method for interlinking heterogeneous fleet systems implemented by a computing device includes: receiving, by a first fleet system, a use request for a moving object from a user device belonging to the first fleet system; transmitting, by the first fleet system, a use inquiry message to at least one second fleet system to which a user does not subscribe, when the use request includes a use of a moving object in the second fleet system; transmitting, by the second fleet system, a second available moving object list corresponding to the use inquiry message to the first fleet system, when the second fleet system permits the moving object to be used; and transmitting, by the first fleet system, to the user device a final moving object list including a moving object that belongs to at least one of the second available moving object list or a first available moving object list in the first fleet system according to the use request.

According to another embodiment of the present disclosure, the use inquiry message may be generated based on the use request, and the use request may be a message that is based on a moving object use time, and the use request may be a message that is generated by including at least one among location information of the user, type information of the moving object, history information, preference information, or rating information.

According to yet another embodiment of the present disclosure, the transmitting of the second available moving object list may be generating the second available moving object list and transmitting the second available moving object list to the first fleet system, when the use request includes at least one of the location information or the type information and a moving object corresponding to at least one of the location information or the type information is retrieved in the second fleet system.

According to yet another embodiment of the present disclosure, the transmitting of the second available moving object list may be generating the second available moving object list and transmitting the second available moving object list to the first fleet system, when the use request includes, along with the moving object use time, at least one of the history information or the preference information and a moving object corresponding to at least one of the history information or the preference information is retrieved in the second fleet system.

According to yet another embodiment of the present disclosure, the location information of the user may be the user's residence, the user's place of work, location information at a time of the use request, or location information at an expected time of a use of the moving object.

According to yet another embodiment of the present disclosure, the history information is propensity information of the user, which is analyzed based on a type of a moving object used by the user, a travel route, a destination point, and a parking spot during a use of the moving object. The preference information is a type of the moving object that is designated based on the user's preference. The rating information may have a rating level that is given to the user based on use status information including subscription information and use performance information for the first fleet system and after-use evaluation information of the moving object.

According to yet another embodiment of the present disclosure, a step of determining a benefit and a penalty for each user according to the rating information of the first fleet system may be further included, and the second available moving object list may be generated based on the benefit and penalty of the rating information of the user.

According to yet another embodiment of the present disclosure, a step of generating evaluation information for a moving object belonging to the second fleet system according to the user's use of the moving object, and the second available moving object list may be generated based on the rating information and the evaluation information.

According to yet another embodiment of the present disclosure, the benefit may include at least one among a specification, model year and cleanliness of the moving object, an area for using a moving object of the second fleet system, or a return range of the moving object.

According to yet another embodiment of the present disclosure, the use inquiry message may be generated based on the use request, and the use request may be a message that is based on a moving object use time, and the use request may be a message that is generated by further including at least one among life pattern information of a user or riding pattern information of a moving object.

According to yet another embodiment of the present disclosure, the life pattern information may be generated based on at least one of the user's consumption information, a destination point of a moving object during a past use of the moving object, or a waypoint of a moving object during the past use. The riding pattern information may be generated based on at least one among an average number of passengers during the past use of a moving object, the age and sex of passengers, or body information of passengers.

According to yet another embodiment of the present disclosure, the transmitting of the use inquiry message may transmit the use inquiry message to the second fleet system when there is no available moving object corresponding to the use request in the first fleet system.

According to yet another embodiment of the present disclosure, the transmitting of the use inquiry message may transmit the use inquiry message to the second fleet system, when there is no available moving object corresponding to the use request in the first fleet system but connecting available moving objects belonging to the first and second fleet systems to each other is possible. The first available moving object list may be generated to include an available moving object of the first fleet system that may be parked in a fleet spot of the second fleet system, and the final moving object list may be presented as a combination of moving objects belonging to the first and second fleet systems.

According to yet another embodiment of the present disclosure, in case the use request includes a preferred use of a moving object of the second fleet system, when there is no available moving object corresponding to the use request in the second fleet system but connecting available moving objects belonging to the first and second fleet systems to each other is possible, the second available moving object list may be generated to include an available moving object of the second fleet system that may be parked in a fleet spot of the first fleet system, and the final moving object list may be presented as a combination of moving objects belonging to the first and second fleet systems.

According to yet another embodiment of the present disclosure, the first fleet system may share use information of a user using a moving object of the second fleet system, and the method may further include a step of updating, based on the use information, at least one of history information, rating information or use pattern information, which constitute the user's use information.

According to yet another embodiment of the present disclosure, the following steps may further be included: receiving, by the first fleet system, evaluation information of a user using a moving object of the second fleet system; updating, by the first fleet system, rating information of the user based on the evaluation information; and transmitting, by the first fleet system, the updated rating information to the second fleet system.

According to yet another embodiment of the present disclosure, the use inquiry message is generated based on the use request, and when the use request includes a request to permit a return to a fleet spot of a fleet system different from a fleet system allocating the moving object, the transmitting of the use inquiry message may be transmitting the use inquiry message to the second fleet system in which a return to another fleet spot is possible.

According to yet another embodiment of the present disclosure, the following steps may further be included: receiving a return request of a fleet spot of a fleet system different from a fleet system allocating a moving object that is reserved by the user device from the final moving object list; and notifying a message approving the return request to at least one of the user device or the moving object, when the return request is permitted in the fleet system allocating the moving object and the fleet system for which the return request is requested.

According to another aspect of the present disclosure, a server of a first fleet system may be provided for a heterogeneous fleet system in which the first fleet system and at least one second fleet system to which a user does not subscribe are interlinked with each other. The server includes a transceiver configured to transmit and receive a signal and a processor configured to control the transceiver. The processor is further configured to receive a use request for a moving object from a user device belonging to the first fleet system, to transmit a use inquiry message to the second fleet system, when the use request includes a use of a moving object the second fleet system, to receive a second available moving object list corresponding to the use inquiry message, when the second fleet system permits the moving object to be used, and to transmit to the user device a final moving object list including a moving object that belongs to at least one of the second available moving object list or a first available moving object list in the first fleet system according to the use request.

According to yet another aspect of the present disclosure, a heterogeneous fleet system may be provided in which a first fleet system and at least one second fleet system to which a user does not subscribe are interlinked with each other. The heterogeneous fleet system may include a first server and a second server configured to manage the first and second fleet systems, a multiplicity of user devices registered to the first and second fleet systems, and a multiplicity of moving objects registered to the first and second fleet systems. The first server is further configured to receive a use request of a moving object from a user device belonging to the first fleet system, to transmit a use inquiry message to the second fleet system, when the use request includes a use of a moving object the second fleet system, to receive a second available moving object list corresponding to the use inquiry message, when the second fleet system permits the moving object to be used, and to transmit to the user device a final moving object list including a moving object that belongs to at least one of the second available moving object list or a first available moving object list in the first fleet system according to the use request.

The features briefly summarized above with respect to the present disclosure are merely exemplary aspects of the detailed description below of the present disclosure, and do not limit the scope of the present disclosure.

A method, device and system for interlinking heterogeneous fleet systems implemented by a computing device may be provided so that a shared moving object may be provided by a different fleet system to which a user device is not registered.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 9 is a view illustrating an example of rating information in a first fleet system.

FIG. 10 is a view illustrating an example of benefit and penalty according to rating information in a first fleet system.

DETAILED DESCRIPTION

Figure 1:
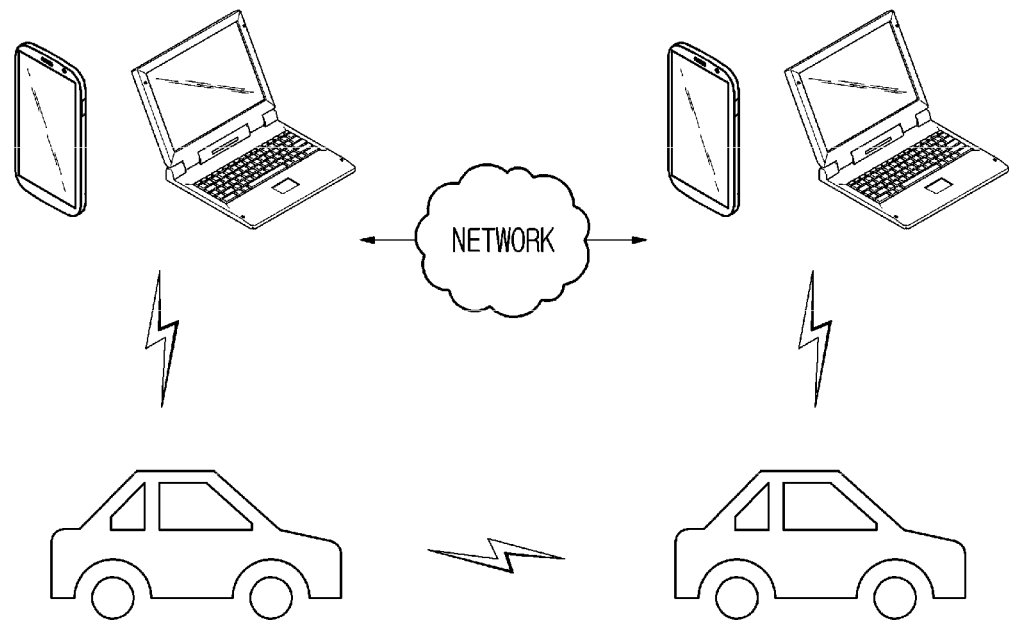
FIG. 1 is a view illustrating that a moving object communicates with another device via a network.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Advantages and features of the present disclosure, and methods for achieving them will be apparent with reference to the embodiments described below in detail with reference to the accompanying drawings. However, the present disclosure is not limited to the embodiments set forth herein but may be embodied in many different forms. The present embodiments are provided to make disclosed contents of the present disclosure thorough and complete and to completely convey the scope of the disclosure to those with ordinary skill in the art.

FIG. 1 is a view illustrating that a moving object communicates with another device via a network.

Referring to FIG. 1, a moving object may communicate with another moving object or another device. Herein, as an example, the moving object may communicate with another moving object or another device based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a moving object, such as DSRC may be used, and the present disclosure is not limited to the above-described embodiment.

In addition, as an example, for the purpose of security of a moving object with respect to communication of the moving object, a module capable of communicating only with a device inside the moving object and a module capable of communicating with a device outside the moving object may exist separately. As an example, inside the moving object, communication based on the security such as Wi-Fi communication may be performed only for a device within a certain range in the moving object. As an example, the moving object and a personal device owned by the moving object driver may include a communication module for performing communication only with each other. That is, the moving object and the personal device of the moving object driver may use a communication network disconnected from an external communication network. Also, as an example, the moving object may include a communication module for performing communication with an external device. In addition, as an example, the above-described module may be implemented as a single module. In other words, based on a single module, a moving object may communicate with anther device, which is not limited to the above-described embodiment. That is, in a moving object, communication may be performed based on various methods and is not limited to the above-described embodiment.

Herein, for example, a moving object may refer to a device capable of moving. As an example, a moving object may be a vehicle (including an autonomous vehicle or an automated vehicle), a drone, a personal mobility, a mobile office, a mobile hotel or a personal air vehicle (PAV). "Personal mobility" may include a moving object including at least three wheels for stable independent driving or a moving object (e.g., a single-wheeled segway, a two-wheeled segway, an electric scooter, etc.) that has one or two wheels but is capable of being driven independently by keeping its balance. A personal mobility may use electricity as a power source by means of a battery but is not limited thereto and may utilize any type of power sources capable of moving the mobility. As an example, a personal mobility may mean a means of transportation that may be taken or used by only one user. In addition, a personal mobility may mean a means of transportation that a small number of users may use as a small means of transportation. As an example, not only a single-wheeled segway, a two-wheeled segway and an electric scooter but also an electric wheelchair, an electric bicycle and an electric two-wheeled vehicle may be a personal mobility. In addition, a moving object may be any other moving device and is not limited to the above-described embodiment.

Figure 2:
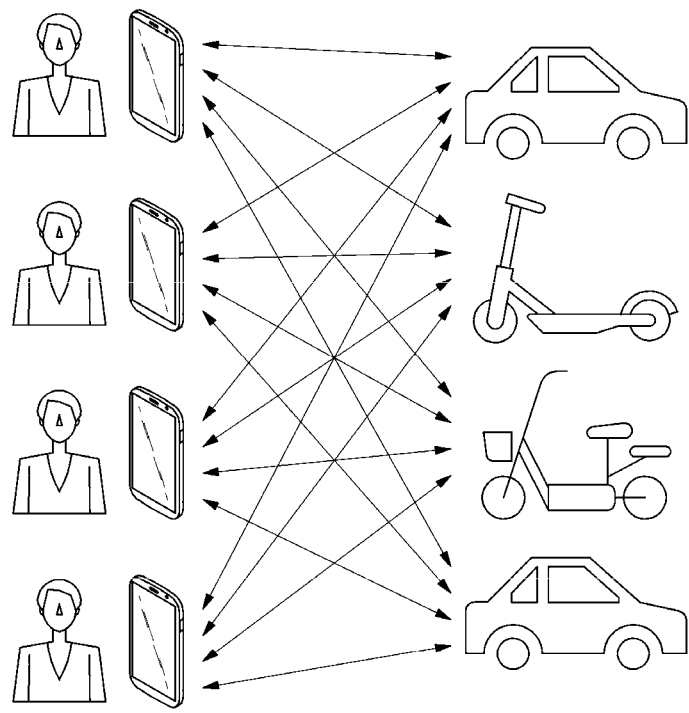
FIG. 2 is a view illustrating that a moving object is shared based on a fleet system.

FIG. 2 is a view illustrating that a moving object is shared based on a fleet system.

As an example, a fleet system may be applied to provide a moving object sharing service. In the present disclosure, there may be a multiplicity of fleet systems, and the multiplicity of fleet systems may be provided by different operating subjects. A user subscribing to each system and information on a shared moving object may be separately managed by respective management servers, and each system may be independently operated when there is no service information or interlink request between systems. The present disclosure will mainly describe a processing process for a multiplicity of fleet systems, when a user subscribing only to a first fleet system wants to use a moving object of another fleet system, to which the user does not subscribe, and uses the moving object. In addition, in the present description, a fleet system, to which a user does not subscribe, is referred to as a second fleet system, and there may be at least one second fleet system. A first fleet system and a second fleet system may constitute a heterogeneous fleet system. Referring to FIG. 2, the description below is related to a first fleet system and a second fleet system respectively and may be commonly applied. As another example, a first fleet system and a second fleet system may be differently embodied in some aspects among an operation, a function, and an operation/management process, which will be described below.

Each fleet system may be operated by data generation, processing and exchange between computing devices. For example, a fleet system may be a system including at least one server, a multiplicity of user devices and a multiplicity of moving objects. For a fleet service, a server may process a request of a user device, transmit a response message, and manage a moving object by processing the reservation and allocation/return of the moving object according to the request. Furthermore, the server may generate status information of every moving object by receiving moving object state information from moving objects so that overall information associated with moving objects may be managed.

In addition, a fleet system may be a system including a multiplicity of devices and a multiplicity of moving objects. In addition, as an example, the fleet system may further include a road side unit (RSU) and the like. Herein, a device may be a smart phone, a smart pad and a smart watch. As another example, a device may be an device capable of performing other communication and exchanging a signal, which is not limited to the above-described embodiment. However, for the convenience of explanation, the terms "device" or "user device" will be used in the description below. In addition, as an example, a moving object may be a vehicle. In addition, as an example, a moving object may be an object moving on rails or other constructed areas. As anther example, a moving object may be a flying object like drone. That is, a moving object may refer to an object capable of moving and mean a shared moving object based on a fleet system. For the convenience of explanation, a moving object will refer to a vehicle in the description below. This may be applied to other moving objects in the same way. As another example, a RSU may be a roadside device capable of communication. In addition, as an example, a RSU may refer to a structure installed for transmitting and receiving a signal to and from a building or another area, which is not limited to the above-described embodiment. However, for the convenience of explanation, such structures will be referred to as RSUs in the description below. RSUs may be various structures or device, which is not limited to the above-described embodiment.

In addition, each fleet system may be a moving object sharing system. A fleet system may be a system in which a moving object is shared in a certain area. Herein, the certain area may be a local concept, such as an apartment complex, a work place, and the like. As an example, the certain area may include an area in an apartment complex or an area a predetermined distance around the apartment complex. As another example, the certain area may mean an area a predetermined distance around the work place. As another example, an area to which a fleet system is applied may be a larger area like an administrative district or a city, which is not limited to the above-described embodiment. That is, the certain area may mean a reference range capable of operation based on a fleet system, and may be changed by a user or a system. In addition, as an example, a fleet system may be a system in which a moving object is shared with a user authenticated as a specific user (or device). As an example, a specific user may be a resident of an apartment in a predetermined range of area or a worker of an office located in a particular region, in which a service of a fleet system may be provided. As an example, the specific user may be a subscriber to a fleet system available in a predetermined service area and be a user outside the service area. Such a user may be a person who wants to use a sharing service when approaching a predetermined service area. As an example, a fleet system may provide a moving object sharing service based on a device that an apartment inhabitant and/or an office worker has registered. Thus, a sharing service may be provided only to a specific person, and the safety and management efficiency of a moving object may be enhanced. However, a specific user using a shared moving object in a fleet system may be determined based on a different method, which is not limited to the above-described embodiment. A shared moving object may be provided in a fleet system. Here, a shared moving object may be a moving object that has been authenticated and approved to be shared by a system. As an example, the shared moving object may be a moving object registered in the fleet system. Here, a fleet system manager may provide a shared moving object for the fleet system. That is, only a moving object authenticated or authorized by the fleet system manager may be used as a shared moving object. Thus, an accident that could occur due to the safety or management of a moving object in a fleet system may be prevented beforehand. Specifically, a moving object to be shared may be registered in a fleet system. A right to register a moving object as a shared moving object in a fleet system may be restricted by the fleet system. Herein, a moving object capable of being registered in the fleet system may have a same ID or same identification information. In addition, as a fleet system provides a shared moving object, the management for the shared moving object may be performed. As an example, the management of a shared moving object may be necessary to provide a shared moving object service, such as residual oil information, moving object state information, or moving object driving information for the moving object registered in a fleet system. Herein, the fleet system may check the state of a shared moving object in real time, and for a moving object having a problem, the permission for use may be restricted or a command of repair may be delivered through the system, based on which a service may be provided.

As another example, a fleet system may provide a mixture of a shared moving object and a privately-owned moving object. As an example, the fleet system may set identification information, such as a moving object ownership indication field, to distinguish a shared moving object provided by the system and a privately-owned moving object. Herein, when the indication field is recorded as a value of not privately-owned moving object, it may indicate a shared moving object that is not privately owned but is provided by a system provider. On the other hand, when the indication field is recorded as a value indicating a privately-owned moving object, it may indicate there is a moving object privately owned and the moving object is provided as a shared moving object in a fleet system. It is also possible to consider a case in which a privately-owned moving object and a shared moving object provided by a system are mixed. Herein, as an example, the fleet system may provide different services based on a moving object ownership indication field. As an example, in the case of a moving object provided by the fleet system, there may be no restriction of use for a user who uses the moving object. On the other hand, in the case of a privately-owned moving object, there may be a restriction of use. As another example, in a fleet system moving object and a privately-owned moving object, a service may be provided based on different charging systems, which is not limited the above-described embodiment.

As another example, in relation to a specific operation of a fleet system, a service may be provided based on a device registered to the fleet system.

Specifically, the device registered to the fleet system may obtain information on a shared moving object after authentication and security procedures with the system. That is, from the perspective of the device, information on the shared moving object may be provided. Herein, the device may contact the moving object to be used based on the information on the shared moving object.

As an example, there may be a moving object and a device (or users) that are registered to a fleet system. That is, based on authentication and authorization, only specific moving objects and devices may be registered to the fleet system. Herein, the fleet system may be operated based on state information of the registered moving objects and the registered devices. As an example, the fleet system may check information on a moving object currently in use and location information on an individual moving object in real time. Herein, as an example, each moving object may periodically transmit its information to the fleet system. In addition, as an example, each moving object may transmit its information to the fleet system based on an event trigger. As an example, when an event of a change in location or in whether or not to use is triggered to a moving object, the moving object may transmit its information to the fleet system (or server). In addition, the fleet system (or server) may check information on a registered device in real time. Herein, as an example, the registered device may not always use a service of the fleet system. Accordingly, activation information indicating whether a registered device uses a service of a fleet system may be needed. Herein, as an example, the fleet system may include list information for a registered device. Among registered devices included in a list of a fleet system, a device, which is currently using a moving object or activates the system to use the moving object may be provided along with list information. As another example, devices may be indicated by being classified into registered devices (deactivated devices) that do not use a fleet system, registered devices (activated devices) that are using a moving object of the fleet system, and registered devices (temporary devices) that are willing to use a moving object. That is, information may be provided as to whether or not actually in use, whether or not there is willingness to use, and whether or not before use although there is willingness to use. In addition, as an example, for a device using a moving object of a fleet system, usage state information may further be indicated. As an example, usage state information may further include information on expected time of use or information on location of use.

Specifically, a fleet system may include list information on a multiplicity of moving objects and a multiplicity of devices that are registered. Herein, the list information may include at least one or more among usage state information, device location information, and moving object location information. Herein, the fleet system may provide a moving object sharing service based on the device location information and the moving object location information. In addition, the above-described usage state information may include at least one or more among information on a moving object in use, information on expected time of the moving object in use, device-moving object matching information, deactivated device information, activated device information, deactivated moving object information, and activated moving object information. Herein, as an example, the usage state information may further include information on a moving object in use that is being used by another device and information on expected time of the moving object in use. In addition, the usage state information may further include device-moving object matching information based on information in a list form. In addition, the usage state information may include activated device information and deactivated device information. As an example, as described above, the activated device information may be a device that is preparing to use a current moving object among devices registered to a fleet system. As an example, the activated device may mean a device that executes a program or an application for the fleet system. Meanwhile, the deactivated device may be a device that is registered to the fleet system but does not use moving object sharing. As an example, the deactivated device may be a device that does not execute or deactivates a program or application for the fleet system.

In addition, a fleet system may include activated moving object information and deactivated moving object information. In this case, as an example, the fleet system may include state information on a multiplicity of moving objects. Herein, the state information on a moving object may be information on the moving object, such as information on whether or not there is abnormality of the moving object, information on remaining distance to drive, or information on energy provision time. That is, the state information on a moving object may be information for determining whether or not the moving object is capable of being provided for moving object sharing, which is not limited to the above-described embodiment. Herein, the fleet system may determine whether or not to activate the moving object based on the above-described state information. For example, for a moving object that has no abnormality of state and has a sufficient residual amount of energy, a fleet system may provide information on the moving object as an activated moving object. A residual amount of energy may be differently understood according to a type of energy source of a moving object. When a moving object has an internal-combustion engine employing gasoline or diesel as a main energy source, the residual amount of energy may be a refuel volume. When a moving object is an electric energy-based engine that generates a driving force by means of a motor employing electricity as main energy source, the residual amount of energy may be residual electric power. When a moving object is a hybrid engine equipped both with an internal-combustion engine and an electric motor, the residual amount of energy may be a refuel volume. When a moving object is a hydrogen energy-based engine that generates electricity in a fuel cell by employing hydrogen as main energy source and generates a driving force of a motor using the generated electricity, the residual amount of energy may be a residual amount of gaseous hydrogen or liquid hydrogen in a tank. When a moving object is a solar energy-based engine that employs sunlight, which is collected through a photovoltaic panel, as main energy source, provides and accumulates power in a battery, and generates a driving force of motor using supplied power, the residual amount of energy may be a residual amount of electric power accumulated in the battery. A solar energy-based moving object may not be provided as an activated moving object according to an expected use distance desired by a user and weather conditions, even when there is a residual amount of electric power. Vehicles like sedans and SUVs, high occupancy vehicles, vehicles for carrying loads, two-wheeled motorcycles, and personal mobilities may be equipped with any one of the above-described engines.

On the other hand, the fleet system may classify a moving object with abnormality as a deactivated moving object. Herein, the fleet system may provide information on the deactivated moving object to an associated system or server. As an example, the associated system or server may perform repair or management for a deactivated moving object, which is not limited to the above-described embodiment.

In addition to this, a fleet system may manage heterogeneous fleet information. The heterogeneous fleet information may be utilization state information of a moving object (hereinafter, referred to as heterogeneous moving object) of a second fleet system and use information of a user (hereinafter, referred to as heterogeneous user), which are generated when the user subscribing to a first fleet system uses the moving object of the second fleet system to which the user does not subscribe. The first fleet system may store and manage information associated with a heterogeneous moving object and a heterogeneous user. For example, utilization state information of a heterogeneous moving object may include use time of the moving object, a travel route, and data regarding whether or not the moving object is poorly used. For example, use information of a heterogeneous user may include type information associated with a class and age of a heterogeneous moving object used by the user, location information at time of use request or at expected time of use, a travel route including a waypoint and a destination point, consumption information during use, fellow passenger-related information, and evaluation information on the use of a heterogeneous moving object. Utilization state information and use information may be reflected in various information managed by the first fleet system illustrated in FIG. 3. Thus, when a user makes a use request for the first fleet system, an available moving object may be searched based on the information described above.

In addition, as an example, a fleet system may classify a moving object with a residual amount of energy below a predetermined level as a deactivated moving object, as described above. As another example, when a moving object with a residual amount of energy below a predetermined level is shared through a device, a fleet system may provide a device user with information on the residual amount of energy through notification. In addition, as an example, a fleet system may provide a user with information on a designated associated system (e.g., a gas station of a specific brand, an electricity charging station, a hydrogen charging station and the like) and provide information indicating the need of energy supply. Herein, the fleet system may exchange charging information or other necessary information with a designated associated system regardless of the user, thereby providing a service.

That is, a user using a moving object sharing system may refuel the moving object at a designated place without paying a fee, and the fee may be processed through the fleet system and an associated system. Meanwhile, as an example, as described above, a device (temporary device)

willing to use a moving object may want to use the moving object by checking a fleet system.

As an example, a moving object to be used may be allocated to a device through a fleet system to which a user has subscribed. Herein, as an example, the fleet system or server may allocate the moving object to the device by using at least one of information on the moving object in use, location information of the moving object, or location information of the device. Meanwhile, as an example, when the fleet system cannot allocate any moving object, the fleet system may provide the device with information on the failure. In addition, as an example, the fleet system may allocate only a moving object within a predetermined distance from the location of the device, which is not limited to the above-described embodiment. Next, the device may come within the predetermined distance from the moving object. At this time, the device may transmit an authentication signal to the moving object. In addition, as an example, the device may use a shared moving object by tagging the shared moving object based on a list of available moving objects. As an example, the device may tag a moving object based on NFC, Bluetooth, or a magnetic means like a transportation card. Herein, when the device tags a shared moving object, an authentication procedure from the fleet system may be performed to provide the moving object to the device. As an example, when the authentication is completed based on the device tagging, the door of the moving object may be opened.

As for a detailed operation for authentication, when a device approaches a moving object within a predetermined distance, an authentication signal may be transmitted to the moving object. Herein, communication available to the moving object and the device may be Bluetooth, NFC or tag, as described above. That is, a procedure for authentication may be performed under certain conditions, which is not limited to the above-described embodiment. When the device approaches or tags the moving object, the moving object and the device may exchange a signal so that whether or not the device may use the moving object is determined and the device is authenticated. Herein, the device may transmit an authentication signal including its identification information to the moving object. Here, based on the identification information of the device included in the authentication signal thus received, the moving object may verify whether or not the device is registered to a fleet system. In other words, based on device identification information, a moving object may determine whether or not a device can use the moving object. As an example, when the device is incapable of using the moving object, the moving object may transmit information on unavailability to the device. As an example, the device may obtain the information on unavailability from an application or another service providing program.

Meanwhile, when the device is capable of using the moving object, the moving object may transmit a signal requesting the execution of an authentication procedure to the device. That is, when the device is legally registered to the above-described fleet system (or server) and the moving object is capable of operating legally based on the fleet system, the moving object may transmit the signal requesting the execution of the authentication procedure to the device. Herein, the moving object may also transmit its identification information and encryption key information included in the signal requesting the execution of the authentication procedure. As an example, both the moving object identification information and the device information may be registered to the fleet system. In this case, the moving object may transmit a signal including the moving object identification information, the device identification information, and the encryption key information to the fleet system.

In addition, the device may also transmit a signal including identification information of a moving object, encryption key information and its own identification information, which are included in a signal requesting the execution of an authentication procedure, to the fleet system.

Then, the fleet system may compare information included in the signal received from the moving object and information included in the signal received from the device. Herein, when the moving object identification information, the device identification information, and the encryption key information all agree, the fleet system may recognize that the device is capable of using the moving object. Then, the fleet system may transmit authentication confirmation information to the moving object and the device. Herein, the fleet system may register, to a database, information indicating that the device uses the moving object. In addition, as an example, time for the device to use the moving object and additional information may be continuously transmitted.

In addition, the moving object may register the device based on the authentication confirmation information and may open the door of the moving object. In addition, a lock may be released to use the moving object, whereby the device may control the moving object.

Herein, as an example, when the above-described authentication is completed, the moving object and the device may periodically exchange signals. That is, while the device uses the moving object, the moving object may continuously confirm the use by periodically exchanging signals with the device.

The above-described use and authentication of a shared moving object assumes a case in which a first fleet system allocates its moving object (hereinafter, referred to as first moving object) to a user who subscribes to the first fleet system.

According to the present disclosure, a case may be included in which a heterogeneous user makes a request to use a moving object to a second fleet system via a first fleet system and the second fleet system allocates a moving object (hereinafter referred to as second moving object) belonging to the second fleet system to the heterogeneous user.

When a device of a heterogeneous user requests allocation including a second moving object of a second fleet system via a first fleet system, the first fleet system may transmit at least one of authentication information of the first fleet system, identification information of a user device, or identification information of the heterogeneous user to the second fleet system, and the second fleet system may authenticate the user device and the heterogeneous user based on at least one of authentication information or identification information.

For example, a first fleet system and a second fleet system may be set to mutual cooperation for permitting a heterogeneous user to use a moving object. In case of cooperation setting, a first fleet system and a second fleet system may share and manage identification information of every user belonging to either system, identification information of every device and authentication information of both systems. Thus, even when a heterogeneous user approaches the second fleet system, the second fleet system may quickly perform authentication without additional authentication only by checking identification information and/or authentication information. Even in case of cooperation setting, not every identification information belonging to either system may be stored, and only the above identification information associated with a device of a heterogeneous user actually requesting the second fleet system may be shared and managed. In this case, as the device of the heterogeneous user approaches the second fleet system first, the second fleet system may receive verification information indicating a valid subscriber to the first fleet system, together with at least one of the identification information or authentication information of system, from the first fleet system. The second fleet system may authenticate the heterogeneous user based on the above-described information. As another alternative method, the second fleet system may request additional authentication for verifying a real heterogeneous user to the device of the heterogeneous user, apart from verification using the above information.

As another example, a first fleet system and a second fleet system may be set to an open form in order to permit a heterogeneous use to use, even when there is no mutual cooperation setting. Open setting may be actually unlimited for access through another fleet system and, as another alternative method, may be restrictively implemented to permit only access through another fleet system corresponding to permission policy information of each system. When a device of a heterogeneous user approaches a second fleet system via a first fleet system, the first fleet system may transmit its own identification and authentication information first, and the second fleet system may permit the access of the first fleet system based on the identification and authentication information. Also, the second fleet system may authenticate the heterogeneous user by receiving identification information of the heterogeneous user and identification information of the device from the first fleet system. In addition to this, apart from the above information, the second fleet system may request additional authentication for verifying a real heterogeneous user to the device of the heterogeneous user.

When a heterogeneous user selects and reserves a second moving object from a final moving object list, a second fleet system may record and manage allocation and reservation information in its server (hereinafter, referred to as second server) and may transmit the allocation and reservation information to a server (hereinafter, referred to as first server) of a first fleet system. The first fleet system may record the reservation information of the second moving object in the first server, and after the end of use, may receive and manage utilization state information of the second moving object and use information of the heterogeneous user from the second fleet system.

When the second moving object is reserved, the second fleet system may register the device of the heterogeneous user to the second server. The second fleet system may provide identification information of the second moving object to the device of the heterogeneous user and may transmit the identification information of the heterogeneous user and the device to the reserved second moving object. In addition to this, the second fleet system may give an authentication key for start of use to the device and the second moving object.

When the heterogeneous user wants to unlock a door in order to actually use the second moving object, an authentication procedure may be performed among the second fleet system, the second moving object and the device of the heterogeneous user in a similar method to the use authentication procedure in the first fleet system. After the start of use, state information on the second moving object may be transmitted to the second fleet system.

Figure 3:
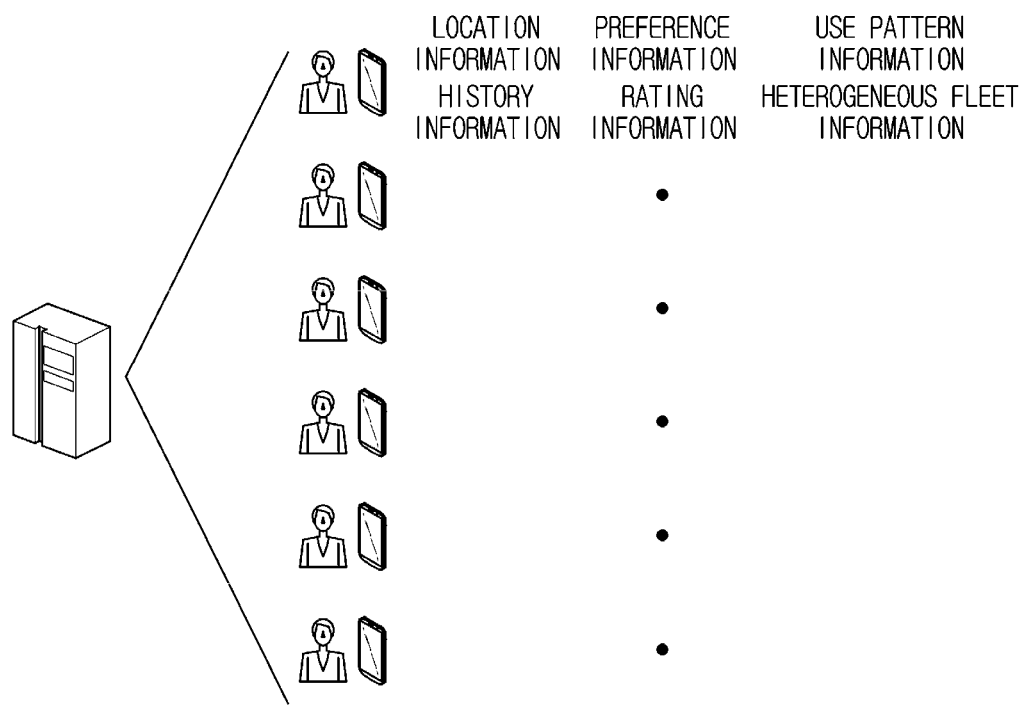
FIG. 3 is a view illustrating that a user is managed based on a fleet system.

FIG. 3 is a view illustrating that a user is managed based on a fleet system.

FIG. 3 illustrates an example of user information managed in a first fleet system to which a user subscribes. Meanwhile, a second fleet system may manage actually same user information as the first fleet system and may have apart of the illustrated user information, for example, location information, history information, preference information and heterogeneous fleet information.

Based on what is described in FIG. 2, a moving object and a device may be managed in a fleet system. Herein, as an example, information of each user may be managed in the fleet system. As an example, information of each user may be information on the user' use based on user identification ID or the user's identification device. As a more concrete example, information of each user may include at least one or more among information on the user's location, information on the user's history, information on the user's preference, information on use status, rating information, and use pattern information. Also, information of each user may further include heterogeneous fleet information. Heterogeneous fleet information may include a multiplicity of datasets. From the perspective of user information, when there is a history of using a moving object of a fleet system to which a user does not subscribe, the heterogeneous fleet information may include use information of the user as heterogeneous user, which is delivered from the fleet system to which the user does not subscribe.

As an example, information on the user's location may be information for identifying the user's main route while using a fleet system. As an example, a user's location information may be static location information set by the user like the user's residence and place of work and dynamic location information like location information at time of use request and location information at expected time of use. In addition, as an example, a fleet system may store history information of a user. History information may be information on a user's propensity, which is analyzed based on a type of a moving object used by a user, a zone used in a fleet spot provided to a fleet system, a travel route, a destination point, and a parking point during use. As an example, a fleet system may perform recommendation for the use of a moving object based on a user's history information. In addition, as an example, a fleet system may perform management for allocating and distributing a moving object by using history information of a multiplicity of users. In addition, as an example, a fleet system may include information on a user's preference. As an example, information on a user's preference may be information considering the frequency or preference of a moving object in use. Specifically, preference information may be a type of the moving object that is designated or estimated by the user as a preferred moving object. In addition, as an example, a user's preference information may be information input by the user, which is not limited to the above-described embodiment.

In addition, as an example, a fleet system may provide rating information of a user. Rating information may be rating levels given to each user based on use state information including subscription information for a fleet system and use performance information and after-use evaluation information. As an example, subscription information may be information on whether or not a long-term contract is made as a contract condition for a service of a fleet system and whether or not premium membership is signed up. Use performance information may include a frequency with which a user uses a moving object, a fee according to time or distance, and the like. As an example, when a user frequently uses a moving object, the rating may be raised. In addition, in relation to evaluation information, a rating level may be lowered when a user smokes or causes bad smell in a moving object and a subsequent user or a manager evaluates a poor use or such evaluation is accumulated. In addition, in relation to evaluation information, a rating level may be raised when a moving object is used without an accident or in a continuously good condition so that no unnecessary maintenance work is needed. Evaluation information may be written for each user based on a moving object, which finishes being used, and use state information of the moving object, which is generated from a server.

In addition, a fleet system may provide information on a user's use pattern. Use pattern information may be generated by collecting at least one of life pattern information or riding pattern information for each user. As an example, life pattern information may be generated based on at least one of a user's consumption information, a destination point of a moving object during past use, or a waypoint of the moving object during past use. Riding pattern information, for example, may be configured based on at least one among a zone and a parking lot, which are used by a moving object, an average number of passengers of the moving object, the age and sex of a passenger, or a passenger's body information. By considering use pattern information, a fleet system may determine at least one zone suitable for a user in a large area and may allocate a moving object placed in the zone. In addition, by analyzing use pattern information, a fleet system may determine a fleet spot for return and an optimal parking lot according to a user's use pattern and may notify when reserving a moving object.

In addition to this, a fleet system may provide heterogeneous fleet information.

Heterogeneous fleet information may include use information of a heterogeneous user using a moving object of a fleet system to which the user does not subscribe (or second moving object of a second fleet system). A fleet system to which the user has subscribed (or first fleet system) may receive use information, which is generated in the second fleet system, after the second moving object finishes being used, and may generate use information of the heterogeneous user based on the use information. The use information of the heterogeneous user may be recorded and managed also in the second fleet system. The use information of the heterogeneous user may be used as information of each heterogeneous user of the second fleet system and may be utilized for various data analyses in the second fleet system.

As described in FIG. 2, use information of a heterogeneous user may include a type of a second moving object used by the heterogeneous user, type information associated with class and age, location information at time of use request or at expected time of use, and a travel route including a waypoint and a destination point. In addition, the use information may include consumption information during use, fellow passenger-related information, and evaluation information on use of the second moving object. For example, the consumption information may be payment information that is generated from a management server of a payment institution during use time of the second moving object. For example, the fellow passenger-related information may be configured based on at least one among the number of passengers of the second moving object, the age and sex of passengers, or passengers' body information. When a second fleet system may not generate passenger-related information, a first fleet system may transmit a query requesting to input passenger-related information of the second moving object through a user device. The passenger-related information, which is input through the user device, may be recorded as heterogeneous fleet information of the first fleet system. When the first and second fleet systems have different evaluation items and different evaluation systems in a same evaluation item, evaluation information may be generated by being transformed to the items and evaluation system of the first fleet system through an evaluation matching table between the systems. As another example, instead of detailed evaluation information on the evaluation item and system of the second fleet system, the first fleet system may receive evaluation score data, which is produced in the second fleet system based on detailed information, and may generate evaluation information based on the evaluation score data.

Type information of the second moving object, location information and a travel route may be reflected in at least one of history information, preference information or use pattern information, which are managed in the first fleet system, so that these pieces of information may be updated. Consumption information and passenger-related information may be updated by being reflected in use pattern information. Evaluation information on the use of the second moving object may be reflected in evaluation information that is written in the first fleet system.

Thus, when a user makes a use request including the first and second fleet systems, the user may search for an available moving object included in the first and second fleet systems on the basis of the above pieces of information.

That is, a fleet system may match a moving object to a user based on various information related to the user. In addition, a fleet system may manage a user based on user-related information.

As an example, the above-described various information may be stored in a server controlling a fleet system and be managed. As another example, at least some of the above-described information may be installed in a moving object or be stored in an identification device capable of tagging or in a user device capable of communicating in a system and a moving object. When a moving object is allocated and used by a user, an identification device may be utilized to identify and authenticate whether or not the user is a user making a reservation. Each fleet system may provide different identification devices, and each identification device may be registered to a corresponding fleet system and be managed by corresponding identification and authentication information. For example, a user may have a first identification device of a first fleet system but may not have a second identification device of a second fleet system to which the user has not subscribed. When a user of a first fleet system is allocated a second moving object of a second fleet system, the second fleet system may receive identification and authentication information of a first identification device from the first fleet system. When the user (or heterogeneous user) applies the first identification device to the second moving object in order to use the second moving object, the second fleet system may permit the control of the heterogeneous user by confirming and verifying the identification and authentication information of the first identification device.

An identification device may transmit data for controlling a moving object, apart from for authentication, to the moving object and a fleet system (server). For example, by storing rating information of a user, an identification device may apply benefit information and penalty information (hereinafter, abbreviated as benefit and penalty respectively) according to a rating level of the user to the control of a moving object. In addition, an identification device may detect a user's poor use through a sensor installed in a moving object, store evaluation information determined in real time, and transmit the information to a server. The server may update evaluation information. In addition, an identification device may collect life pattern information like the real-time travel path, destination point and waypoint of a moving object in real time and transmit the information to a server so that the server may update life pattern information or change a return zone and a parking lot that are designated at the time of reservation. In addition, an identification device may obtain riding pattern information different from at the time of reservation in real time and transmit the information to a server so that the server may update riding pattern information.

Figure 4:
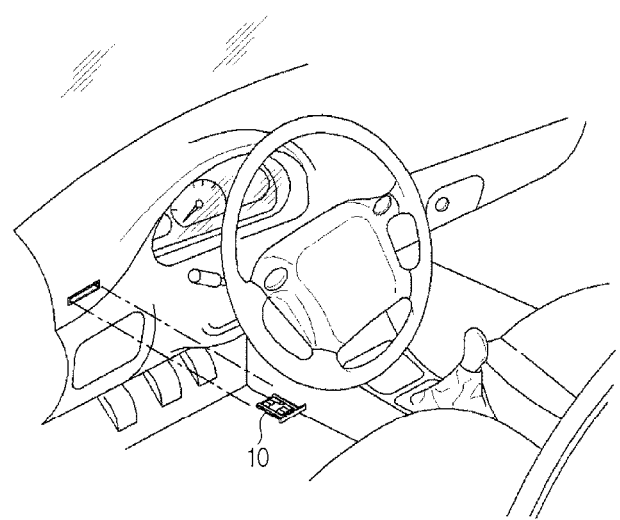
FIG. 4 is a view illustrating an example in which an identification device is applied to a moving object.

The shape of the above-described identification device is illustrated in FIG. 4. FIG. 4 is a view illustrating an example in which an identification device is applied to a moving object.

Various examples of identification device described through FIG. 4 may be commonly applied to first and second identification devices utilized in first and second fleet systems. In FIG. 4, first and second identification devices are not distinguished but are described by being collectively referred to as an identification device.

The identification device may be a device having at least any one or more functions of identifying a user, a control target, and a service target. In addition, as an example, the identification device may be a device having an ID function. In addition, the identification device may be at least any one or more among a smart device, a smart module, a user identification module, and an identification module. That is, the identification device may be a hardware configuration. In addition, the identification device may be a software configuration used for the above-described identification. Herein, as an example, the identification device may be a subscriber identity module (SIM). As an example, an SIM, which is applied as an identification device to a moving object, may be at least one or more of a mobility SIM (M-SIM) and a vehicle SIM (V-SIM). In addition, as an example, the identification device may be a module that is the same as or compatible with an existing SIM, which is not limited to the above-described embodiment.

As described above, an identification device may be applied to a moving object by considering such a case in which the moving object performs communication with an external device. As an example, a user may be recognized through a universal subscriber identity module (USIM) in a user's device phone, and a service may be provided. Based on what is described above, a moving object may also have an embedded identification device card. As an example, as an identification device applied to a moving object, a vehicle SIM may be referred to as VSIM. That is, as an identification device applied to a moving object, a new type of identification device may be applied. As an example, a VSIM may be compatible with a USIM or another SIM. In addition, a VSIM may provide another service by considering a characteristic of a moving object, which is not limited to the above-described embodiment.

As in FIG. 4, there may be a part in a moving object, to which an identification device 10 is applicable. Herein, FIG. 4 is merely an example to which an identification device is applied, and the present disclosure is not limited to the above-described embodiment. Specifically, as shown in FIG. 4, a part for applying the identification device 10 may exist in a position visually identifiable at the driver's seat of a moving object. Although not illustrated herein, as another example, the identification device may be applied inside the glove compartment of a passenger seat in a moving object. As another example, the identification device 10 may be inserted into a part where a display of a moving object is present, which is not limited to the above-described embodiment, and there may be a slot capable of holding an identification device in a suitable part inside or outside a moving object. As another example, in consideration of the portability of an identification device, the identification device may be embodied in a combined state with a tool key or a car key. That is, an identification device may be installed in a tool key or a car key, and the identification device may be removed from the car key and be used by being installed in a moving object. A tool key or a car key may communicate with a moving object via a local area network (e.g., Bluetooth, Beacon, NFC) and thus perform message exchange and identification. That is, a car key or a tool key reflecting the uniqueness of an individual may be used as an identification device, which is not limited to the above-described embodiment.

As another example, the above-described identification device may be installed through an existing device, which is installed in a moving object. As an example, an existing device (e.g., toll payment terminal, black box) may be installed in a moving object. As another example, an identification device may be recognized through an existing terminal (e.g., USB port, cigar jack socket) included in a moving object.

As another example, an identification device may be applied to any position in a moving object within a range capable of authentication, and the identification device may be applied either as an integrated form or a separate form to a control unit, a communication unit or constitutional parts of the moving object.

Figure 5:
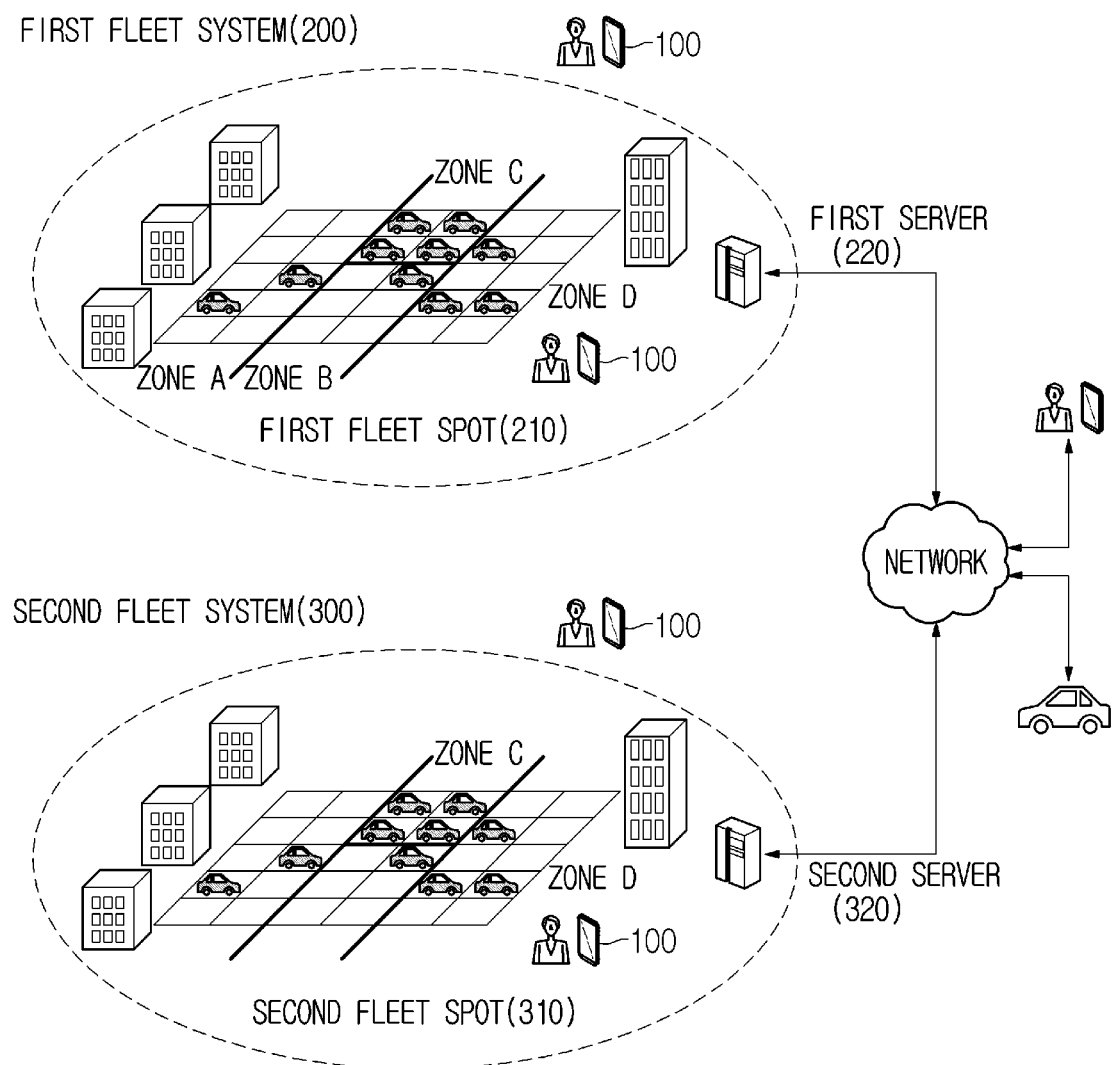
FIG. 5 is a view illustrating an example of a multiplicity of fleet spots to which an interlinking method for heterogeneous fleet systems is applied according to an embodiment of the present disclosure.

FIG. 5 is a view illustrating an example of a multiplicity of fleet spots to which an interlinking method for heterogeneous fleet systems is applied according to an embodiment of the present disclosure.

In FIG. 5, a user subscribes only to a first fleet system 200 but does not subscribe to a second fleet system 300. For the convenience of explanation, FIG. 5 illustrates that the user does not subscribed to one fleet system, that is, the second fleet system 300. The present disclosure is not limited to the above-described embodiment, but a multiplicity of fleet systems may be provided as fleet systems to which a user does not subscribe, and such fleet systems may be provided by different operators. The description below may be common to the first fleet system 200 and a multiplicity of fleet systems to which a user does not subscribe.

The first fleet system 200 is a system, to which a user of this example has subscribed, and may have and operate a fleet spot that is a space in which a shared moving object may be allocated and returned. A fleet spot may be a region in which a shared moving object is kept and a service is provided in a predetermined area. As an example, the predetermined area may be located as an area near a region dense with residential districts and/or commercial districts. This aims to enable a fleet system to enhance the convenience of a service for persons using buildings near residential and/or commercial buildings holding many people or a large floating population. People who are likely to use a fleet system include not only inhabitants of buildings but also other people using the fleet system for various purposes like visiting a neighboring area of a fleet spot or transferring to another moving object via the fleet spot.

A fleet system according to the present embodiment may be operated by a small number of moving objects and be operated also by a large number of moving objects for expanding services and ensuring convenience through the fleet system. When being operated by a large number of moving objects, a fleet spot may have a large area of space for holding various types of many moving objects. When a fleet spot is operated in a large area of space, a lot of moving objects may be deployed to be held uniformly across the large space and be deployed by considering a building around the fleet spot, the number of residents, a floating population, and the like. Accordingly, a fleet spot may be divided into a multiplicity of zones, as shown in FIG. 5, in order to efficiently manage many moving objects. A holding area and a parking lot may be allocated to a zone by considering information of the neighboring area of the zone such as a building around a fleet spot, the number of residents, a floating population, and the like. For example, in the case of Zone A near an area dense with commercial buildings, by considering the number of residents of a building, the number of visitors, an expected purpose of a moving object (e.g., outside duty, delivery, non-occupational personal business, etc.) and average use state of a moving object (e.g., cleanliness, frequency of request of light maintenance, long travel, average number of passengers, etc.), small-sized sedans, medium-sized sedans, 7-to-11 seater vehicles and personal mobilities may account for a large percentage of moving objects, while large-sized premium sedans may be allocated at a low percentage. In addition, among small and medium-sized vehicles allocated to Zone A, a larger number of vehicles may have intermediate and excellent levels in class aspects like age and cleanliness rather than top level. In addition, as for large-sized premium vehicles allocated to Zone A, excellent and top levels may account for a larger percentage. As another example, in the case of Zone D near a residential region, moving objects are used mainly for personal purposes like shopping, commuting, riding with family, and many other purposes belonging to personal life styles, and clean use and frequency of requesting light maintenance may be relatively better. Based on this, small to large-sized sedans and 7-to-11 seater vehicles may be uniformly allocated in Zone D, and vehicles with excellent to top levels in age and cleanliness may be allocated to account for a relatively large percentage.

As another example, a maintenance or check-up zone may be allocated among zones of a fleet spot. For example, a fleet system may instruct a user of a moving object to return the moving object not to an original return zone but to a maintenance zone, when the moving object to be returned has no reservation for a predetermined time and the fleet system determines the need of check-up for the moving object or the need of urgent maintenance based on the state information of the moving object, even if there is a subsequent reservation. As another example, when a fleet system determines the need of check-up for a moving object not in use but parked in a non-maintenance zone, the fleet system may move the moving object to a predesignated zone in an unmanned or manned manner. Herein, the predesignated zone may be a place of maintaining and managing a moving object such as a garage, a car wash and a cleaning service for the interior of a moving object.

As another example, a fleet system may manage moving objects by grouping the moving objects in units of a predetermined number. Specifically, at a request of a user device, the fleet system may perform processing to make a moving object allocated to a user group or an exclusively allocated moving object group held mainly in a specific zone of a fleet spot.

In addition, the fleet system may perform maintenance and management for each group of moving objects. In the above-described example, when a maintenance zone is a garage, a car wash and the like, a designated zone (a garage, a car wash, a cleaning service for the interior of a vehicle, a vehicle, a moving object running on a route, PAV, UAM, a maintenance zone in a mobility hub enabling transfer of personal mobilities, and the like) for maintaining and managing moving objects may be set for each group of moving objects. That is, when the maintenance and management for a moving object is necessary, a fleet system may move the moving object to a designated zone of each group in a manned or unmanned manner, thereby enabling the moving object to be maintained and managed. As the maintenance and management for moving objects is performed in each group of moving objects, as many moving objects as possible may be maintained and managed in a limited time.

As another example, a fleet system may enable a moving object to be quickly maintained and inspected during an inspection time by placing a support unit for maintaining and managing moving objects in each group of moving objects. For example, the support unit may be a maintenance vehicle placed for maintaining and managing moving objects.

As an example, a fleet system may be operated so that a central server manages moving object state information related to the allocation/return state, location and use state of a moving object and re-allocation of a zone of a moving object for a multiplicity of zones and processes each type of the user information described above. As another example, a fleet system may be operated in a distributed way so that a slave system for each zone is allocated to process and manage a task related to the moving object and a central master server accepts a user's use request and manages a task until the allocation of a moving object in a specific zone and various information of each user. A master server may receive a processing result of a task related to a moving object and update information of each user. Hereinafter, for the convenience of explanation, a central server will be described to process a moving object and information of each user and to manage every zone, but it is not excluded that such processing is performed in a master server and a slave system.

In principle, a fleet system is operated to rent a moving object in a fleet spot and to return the moving object to a corresponding zone and may also be flexibly operated to return the moving object to another zone different from the corresponding zone according to rating information of each user and use pattern information. In addition, a fleet system may permit return to a different type of fleet system by considering a type of premium service used by a user, a temporary request and rating information.

FIG. 5 illustrates that zones are allocated next to each other on the ground surface. However, according to the distribution of neighboring buildings and populations, the zones may be separated from each other within a distance range in which a user may easily move by walk or by means of a personal mobility for a short range. As another example, zones may be set as a multiplicity of zones for each floor of multi-story buildings and facilities in order to enhance the availability of ground surface. Although FIG. 5 shows an example in which a first fleet spot 210 of the first fleet system 200 is divided into zones, the first fleet spot 210 may not be divided into zones, and various types of moving objects may be distributed all over the first fleet spot 210 irrespective of types and classes of moving objects. A second fleet spot 310 of a second fleet system 300 may be divided into zones according to each type of moving objects, or various types of moving objects may be distributed all over the second fleet spot 310 irrespective of types of moving objects.

Hereinafter will be described that a fleet system implemented by a computing device allocates and manage a moving object.

A fleet system incorporates an application or program that allocates and manages a moving object and generates and manages various information related to a user. For the convenience of explanation, such applications and programs will be collectively referred to as applications. An application may implement an allocation and management process based on requests and data mutually transmitted among a user device, a shared moving object and a server. Such an application may be embedded in a user device, a shared moving object and a server so that the server may implement the process by obtaining information generated from each computing device. For the convenience of explanation, it is mainly described that a server executes the process. However, for example, in order to secure a storage space of a server memory, data generated by using a moving object may be accumulated in a user device and/or the moving object, and the data thus accumulated until the time of request may be transmitted to the server at the request of the server.

FIG. 5 shows an example in which each fleet system is operated as a large-sized one fleet spot in a large residential and/or commercial district. The present disclosure is not limited thereto, but a fleet system may have fleet spots for a multiplicity of districts and an application may provide a fleet spot, which matches an expected use location input by a user, and an available moving object list.

Figure 6A:
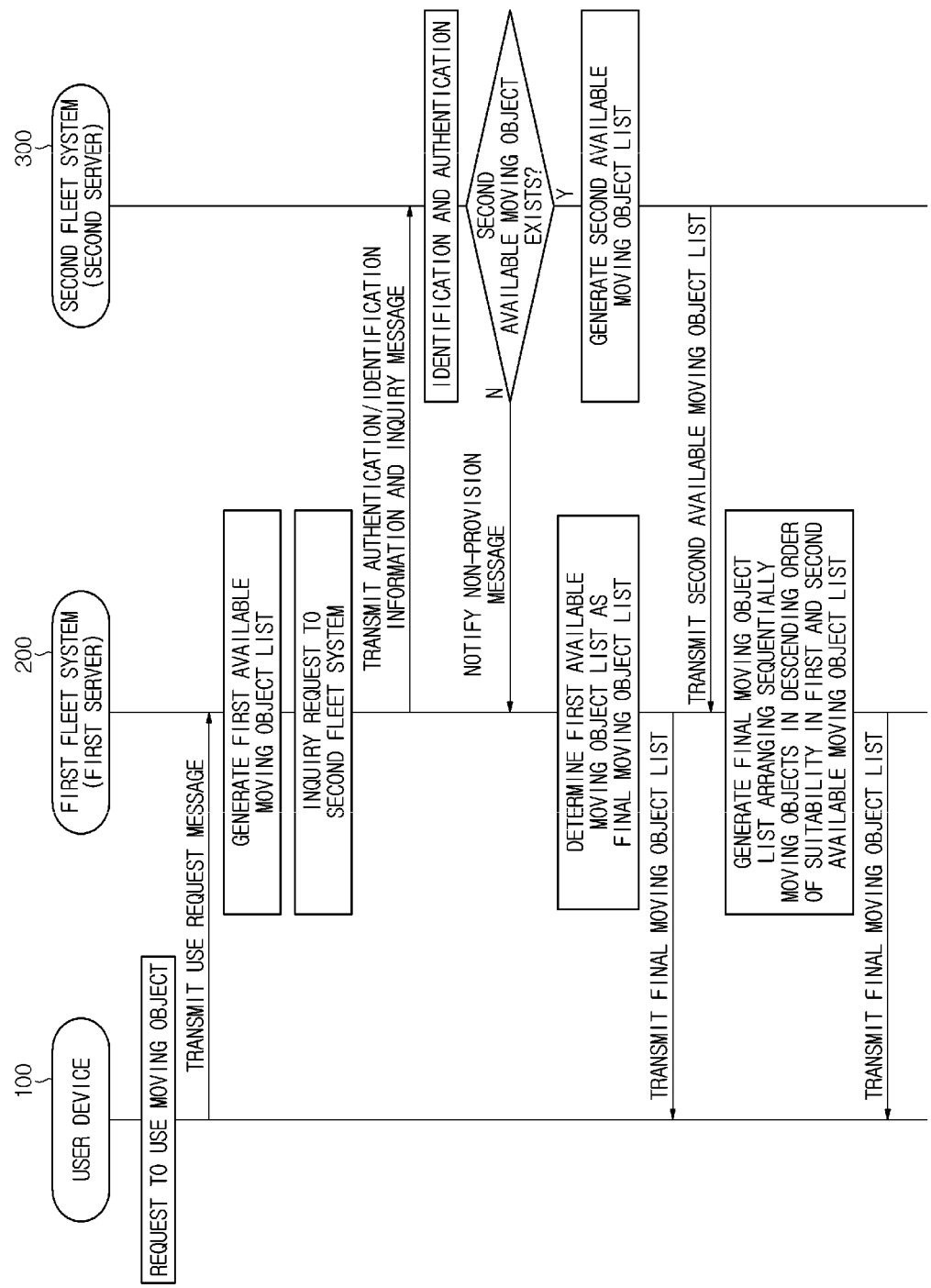
FIGS. 6A and 6B are flowcharts illustrating an interlinking method for heterogeneous fleet systems according to an embodiment of the present disclosure.
Figure 6B:
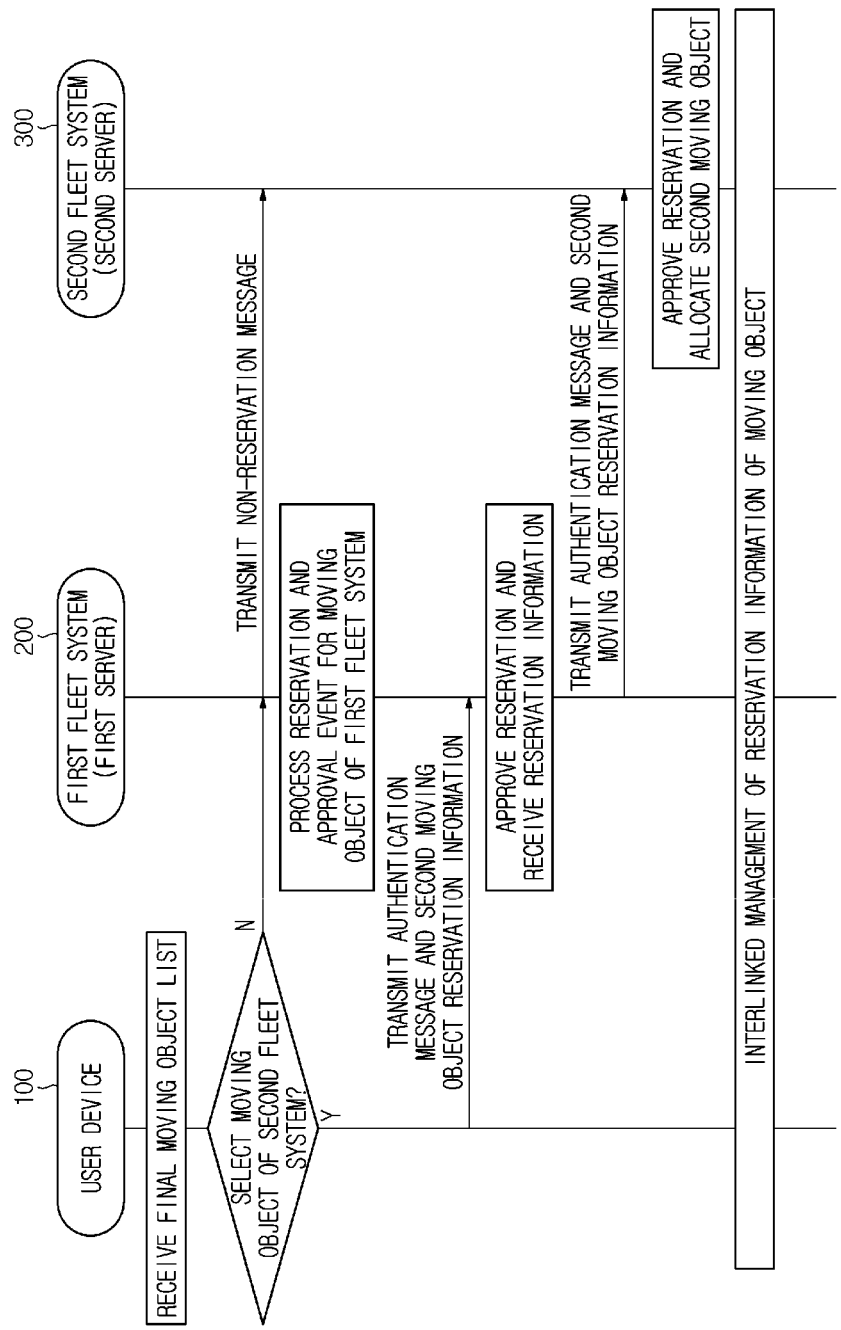

FIGS. 6A and 6B are flowcharts illustrating an interlinking method for heterogeneous fleet systems according to an embodiment of the present disclosure.

First, a user device 100 may make a request to use a moving object to a first server 220 of the first fleet system 200. As the use request includes at least moving object use time, the use request transmitted to the first server 220 may be a message that is generated based on the moving object use time. The request may be a message using only a first moving object of the first fleet system. However, in order to describe an embodiment according to the present disclosure, the request may include a message requesting to use first and second moving objects belonging to the first fleet system 200 and the second fleet system 300. As described in FIG. 2, the second fleet system 300 may be set to cooperate with the first fleet system 200 or may be set as an open type permitting a heterogeneous user (hereinafter, also referred to as first user) to use without a policy for restricting the access of the first fleet system 200. A non-subscribed fleet system included by the use request may include all the above-described fleet systems. Through the request, the user device 100 may be set to include a fleet system of cooperation and/or open type. The user device 100 may set in advance whether or not to use the second fleet system 300 through an application and a program provided by the first fleet system 200. When set in advance, the use request may be a message based on moving object use time.

As an example, a use request message may be generated by further including a user's location information together with moving object use time and the use of a second moving object. As an example, a first user's location information may be a residence or a place of work, which the first user has registered. In addition, the first user's location information may be location information at time of use request, which is identified through a user device, or location information that the first user has input as an expected location at time of using a moving object. For example, when a residence or a place of work is set as location information either basically or later, the location information may be determined. As another example, when the first user subscribes to the first fleet system 200 providing a first fleet spot near the residence, if the first user selects and input location information at the time of use request other than the place of work or manages other location information at expected time of use, the location information may be set as a selected location. For example, the first user may input a place of work, in which the first fleet system is not available, as location information.

A use request may be a message including, apart from moving object use time and the use of a second moving object, at least one among moving object type information, history information, preference information or rating information. A type of moving object may be the type and detailed class of a moving object selected by a user device at the time of request. The type may be sedan-type vehicles with small to large sizes, SUVs, 7-to-11-seater vehicles, vehicles for transporting loads, and personal mobilities. A class may be a brand, a specific model, model year, cleanliness, good maintenance condition, etc. As history information, preference information, rating information and use pattern information were described above, further descriptions are skipped. The user device 100 may set in advance whether or not to include the above-described information through an application and a program that are provided by the first fleet system 200. When set in advance, a use request may be a message based on moving object use time and information set in the user device 100, excluding a user's location information. Even when setting in advance, if the user device 100 further sets or demands at the time of request that a use request message is to be generated by including location information along with the above-described setting information and use time, the use request message may be generated including all the information described above and may also be generated based on location information requested by a user in preference to the user's estimated location information inferred from the setting information.

Next, the first server 220 may determine at least one zone corresponding to the use request and may check and generate a first available moving object list including a first available moving object of the zone.

When a use request is a message that is generated by moving object use time, a user's location information and moving object type information together with the use of the second moving object, the first server may check the first moving object available at use time in each zone by referring to scheduling for the use of the first moving object and may sort moving objects sequentially from a nearest zone to gradually further zones according to the user's location information among zones in which the first available moving object is confirmed. The sorting of moving objects may be set up to a predetermined number of moving objects.

As another example, a use request may be a message that is generated as a combination of location information and other information or as other information without location information, along with time to use a moving object. For example, when location information is not included and other information is at least one of history information or preference information, the server may search use scheduling for the first moving object suitable for a moving object type identified in history information and/or preference information and a past/preferred zone of a fleet spot. The first server may select the first available moving object corresponding to the type in at least one searched zone. Herein, when there is no moving object corresponding to a moving object type and a use zone, the first server may match a zone and a moving object close to the moving object type and the use zone. In addition, when history information further includes at least one of the user's travel route, a destination point or a parking lot during use, the first server may generate history information by weighting a travel route, a destination point, and a parking lot, which have occurred more frequently than once. By using the history information thus generated, the first server may analyze the user's purpose of using a moving object, for example, whether or not the user has a personal purpose like a long drive, a business trip for visiting an office, shopping or a visit to house. When an analysis result based on history information is a business trip with a long drive, the first server may check first available moving objects with a recent model, middle or low rating and low mileage in every zone. In addition, the first server may further consider a moving object type and a use zone. In this case, a zone and a first moving object corresponding to the type and the use zone may be selected among moving objects identified based on a purpose of use. Meanwhile, when a zone is determined as a use request is generated as a message combining the user's location information with history information and/or preference information, the user's location information may be set to be preferred to zones in the history information and/or the preference information. Thus, among first moving objects identified in history information and the like, the first server may select a first available moving object from a nearest zone to further zones according to a location of the user's location information.

In case a use request is based on history information, the history information may include not only information on a first moving object but also relevant information extracted from heterogeneous fleet information based on use state information of a heterogeneous moving object, which a user used in a non-subscribed fleet system, and use information of a heterogeneous user. The first server 220 may receive a use request based on the history information.

As another example, other information of a use request may be rating information. A use request may be a message that is generated as a combination of a user's location information and rating information or rating information without location information, together with time to use a moving object. The first server may check a benefit and a penalty, which are given to a user making a use request according to a rating level of rating information, and determine a condition for allocating a moving object based on the checked benefit and penalty. For example, the first server may determine an available moving object and a zone of the moving object, which correspond to an allocation condition including the type, specification, model year, cleanliness and allocation zone of moving object. As a concrete example, when a user requests a latest sedan with premium specification as a detailed option of a use request, although the user has rating information of a low rating level permitting no premium sedan and not considering allocation of a neighboring zone, the server may not consider the detailed option of the user. Specifically, the server may check available moving objects from sedans with specifications lower than premium level, and when the user's use request overlaps with a use request of another user with higher rating than the user, the server may determine a moving object of a zone that is not adjacent to the user's location information.

In case a use request is based on rating information, the rating information may include not only information in the first fleet system 200 but also relevant information extracted from heterogeneous fleet information caused by a heterogeneous moving object, which a user used in a non-subscribed fleet system. The first server 220 may receive a use request based on the rating information.

As another example, other information of a use request may be use pattern information. A use request may be a message that is generated as a combination of a user's location information and use pattern information or as use pattern information without location information, along with time to use a moving object.

As described above, use pattern information may be generated by collecting at least one of life pattern information or riding pattern information for each user. In case a use request is based on use pattern information, the use pattern information may include not only information in the first fleet system 200 but also relevant information extracted from heterogeneous fleet information caused by a heterogeneous moving object, which a user used in a non-subscribed fleet system. The first server 220 may receive a use request based on the use pattern information.

Use pattern information may be set by a user before or at the time of use request and may be generated as a message of use request. In addition, use pattern information may be inferred from driving location information of a moving object, which is obtained according to a user's agreement, the user's data of purchase/trade of goods and services during the time of using the moving object, and boarding information recognizable from communication among an image acquisition device installed in the moving object, an ultra wide band (UWB), a beacon, Bluetooth, Wi-Fi, identification devices installed in the user device of every driver/passenger and the moving object. Life pattern information and riding pattern information may be inferred based on at least one of driving location information, purchase/trade data, or riding information. For example, driving location information may be a place as a waypoint of a user using a moving object, a destination, parking and stopping places, and the like, which may be a shopping mall, a hospital, and a specific building as the destination of business trip. Purchase/trade data may be a list of goods and services that a user purchases and consumes while using a moving object. The goods may be purchased in a shopping mall, a market, an outlet and a clothing shop, and the services may be medical services and cultural services like film and theater. Life pattern information may be determined based on a list of goods/services that occur with high frequency in recent time of using moving objects. For example, when payment information frequently occurs recently in a large hospital, an orthopedist's office, and other hospitals related to special diseases, life pattern information may be set by applying a weight to a medical service rather than other items with reference to the recent payment information. The use pattern information of a specific user may be determined by comprehensively considering not only payment information but also driving location information, which is confirmed by a recent frequent destination like a hospital, and riding information like old people riding mainly in time of use related to visit to hospitals. Of course, as driving location information, purchase/trade data and riding information are information that vary over time, information on a multiplicity of locations, a list of purchased items and passengers, which are included in use pattern information, may be configured in a ranking order by applying a higher weight to the above-described information obtained through a user's time of recent use than past information.

When a use request is a message including life pattern information, the first server may determine an allocation condition of the first moving object according to the life pattern information for a user making the use request. For example, as a result of searching for a waypoint and a destination, which a user making a use request has frequently visited in recent days, purchase/trade data and the like, the first server may find that the user has spent much money and purchased a lot of goods in a specific shopping mall and may receive a message including the shopping mall as an expected driving location. The first server 220 may determine a first available moving object and a zone of the moving object, which correspond to an allocation condition including the type, specification, model year, cleanliness and allocation zone of a moving object. As in the example described above, when life pattern information of the user making a use request purchases a lot of goods in a shopping mall, the first server may select a first available moving object that is a SUV type with a size capable of loading a lot of goods, is not a latest model but manufactured 3 or 4 years ago and has an intermediate to low level of cleanliness. As a first fleet system allocates a first moving object so that an allocation zone and a return zone are as identical as possible, the first server may select and present the selected moving object from a nearest zone to the user's residence. Thus, as the user returns the first moving object to the return zone near the residence, the user may be able to bring a lot of goods purchased by the user to the residence by taking a short distance.

As another example, as a result of browsing use pattern information of a user making a use request, when a middle-aged driver recently visits a specific hospital with an elderly passenger on a regular basis and there is payment information for hospital services, if moving object use time is requested to actually match a period of visiting the hospital, the first server may determine, based on use pattern information, a first available moving object, which satisfies an allocation condition including the type, specification, model year, cleanliness and allocation zone of a moving object, and a zone of the moving object. In the example described above, the first server may select the first available moving object of sedan type with medium or large size, which a multiplicity of passengers may ride in comfortably and has a latest age and an excellent or higher level of cleanliness. For the convenience of use for an elderly passenger, the first server may select and present the selected moving object from a nearest zone as possible to a user's residence.

Next, the first server 220 may transmit a use inquiry message to a second server 320 of the second fleet system 300 according to a use request. The second fleet system 300 may be at least one system managed by different operators. The use inquiry message may be transmitted to a multiplicity of non-subscribed fleet systems according to indication or setting by the user device 100 and/or the first server 220. When there is a multiplicity of second fleet systems, the use inquiry message may be transmitted to all the second fleet systems. As another example, when a specific second fleet system is impossible to provide a service according to a use request, the use inquiry message may not be transmitted to the second fleet system corresponding to the impossible situation but only to a second fleet system capable of providing the service. For example, the impossible situation may be a situation in which the second fleet system has no moving object to allocate at the moving object use time included in the use request or a second fleet spot of the second fleet system is a predetermined distance or farther from location information according to the use request so that the user may hardly use the second fleet spot. Before transmitting the use inquiry message, the first server 220 may transmit, to a multiplicity of second fleet systems, a query message concerning whether or not the use request is impossible to satisfy. The first server 220 may transmit a use inquiry message to a second fleet system that receives a possible situation as a response to the query message.

In addition, the first server 220 may transmit at least one among authentication information of the first fleet system 200, identification information of the user device 100, or identification information of a heterogeneous user, to the second server 320 of the second fleet system 300. Furthermore, identification and authentication between the first fleet system 200 and the second fleet system 300 may be performed in the actually same manner as described in FIG. 2.

Next, the second server 320 may identify and check, based on at least one of authentication information or identification information, whether or not there is restriction on access of the first fleet system 200 and the user device 100. As a result of checking, when access is permitted, the second server 320 may authenticate the first fleet system 200 and the user device 100.

Next, the second server 320 may check whether or not there is a second available moving object corresponding to a use inquiry message. Based on the use request, the use inquiry message may include, along with use time, the above-described information included in the request, for example, at least one of location information, type information of a moving object, history information, preference information, rating information or use pattern information. The existence of the second available moving object is checked in the actually same process as described for searching for the first available moving object corresponding to the use request.

When the second available moving object corresponding to the use inquiry message does not exist, the second server 320 may transmit a non-provision message to the first server 220. As an example, when there is a request of a subscriber-user of the second fleet system 300, which is the same as the use inquiry message and the request and the use inquiry message compete with each other, the second server 320 may allocate the second available moving object preferably to the subscriber-user. As another example, when heterogeneous users not subscribing to the second fleet system 300 compete with each other, the second server 320 may allocate the second available moving object preferably to a heterogeneous user with better evaluation information on the basis of evaluation information based on heterogeneous fleet information stored in the second server 320. As yet another example, when non-subscribed heterogeneous users compete with each other, the second server 320 may request evaluation information to each fleet system to which the heterogeneous users have subscribed and may allocate the second available moving object sequentially from a heterogeneous user with best evaluation information.

When a non-provision message is transmitted, the first server 220 may generate a first available moving object list based on a first available moving object matching a use request and may determine the list as a final moving object list. The first server 220 may transmit the final moving object list to the user device 100, and the user device 100 may select a first moving object from the final moving object list and may request reservation information to the first server 220. Then, the first server 220 may allocate the first moving object to the user device 100 based on the reservation information. On the other hand, when there is no first available moving object matching the use request, the first server 220 may transmit a non-provision message of first and second moving objects to the user device 100.

When there is a second available moving object corresponding to a use inquiry message, the second server 320 may generate a second available moving object list based on the second available moving object, and may transit the list to the first server 220.

In case a first available moving object list is generated, the first server 220 may generate a final moving object list by combining first and second available moving object lists. The final moving object list may be so written as to arrange first and second moving objects, which are presented in the available moving object lists, in a descending order of suitability for the use request. When there is no first moving object corresponding to the use request so that no first available moving object list is generated, the first server 220 may generate a final moving object list based on the second available moving object list.

Next, the first server 220 may transmit the final moving object list to the user device 100, and the user device 100 may select a moving object from the final moving object list including at least one of first and second moving objects and may make a reservation.

When the user device 100 select a first moving object, the first server 220 may receive and approve reservation information of the first moving object. The first server 220 may allocate the first moving object and manage reservation information. In addition, the first server 220 may transmit, to the second server 320, a non-reservation message notifying that the second moving object is not finally selected.

When the user device 100 selects the second moving object, the first server 220 may receive reservation information of the second moving object and a message requesting to authenticate the reservation of the second moving object and may transmit the reservation information and the message to the second server 320. The reservation authentication message may include at least one of identification information of the user device 100 or identification information of a heterogeneous user, along with reservation authentication information of the first fleet system 200. The second server 320 may confirm and verify the reservation authentication message and reservation information, finally approve a first user's reservation of a second moving object, and allocate the reserved second moving object.

Next, the first server 220 and the second server 320 may share reservation information and authentication processing information with each other and may interlink and manage relevant information until processing the end of use.

The embodiment according to FIG. 6 shows an example in which a user subscribing to the first fleet system 200 interlinks with and uses the second fleet system 300. However, the present disclosure is not limited to the embodiment, and the description above may be applied to another embodiment in which a user subscribing to the second fleet system 300 interlinks with and uses the first fleet system 200.

Figure 7:
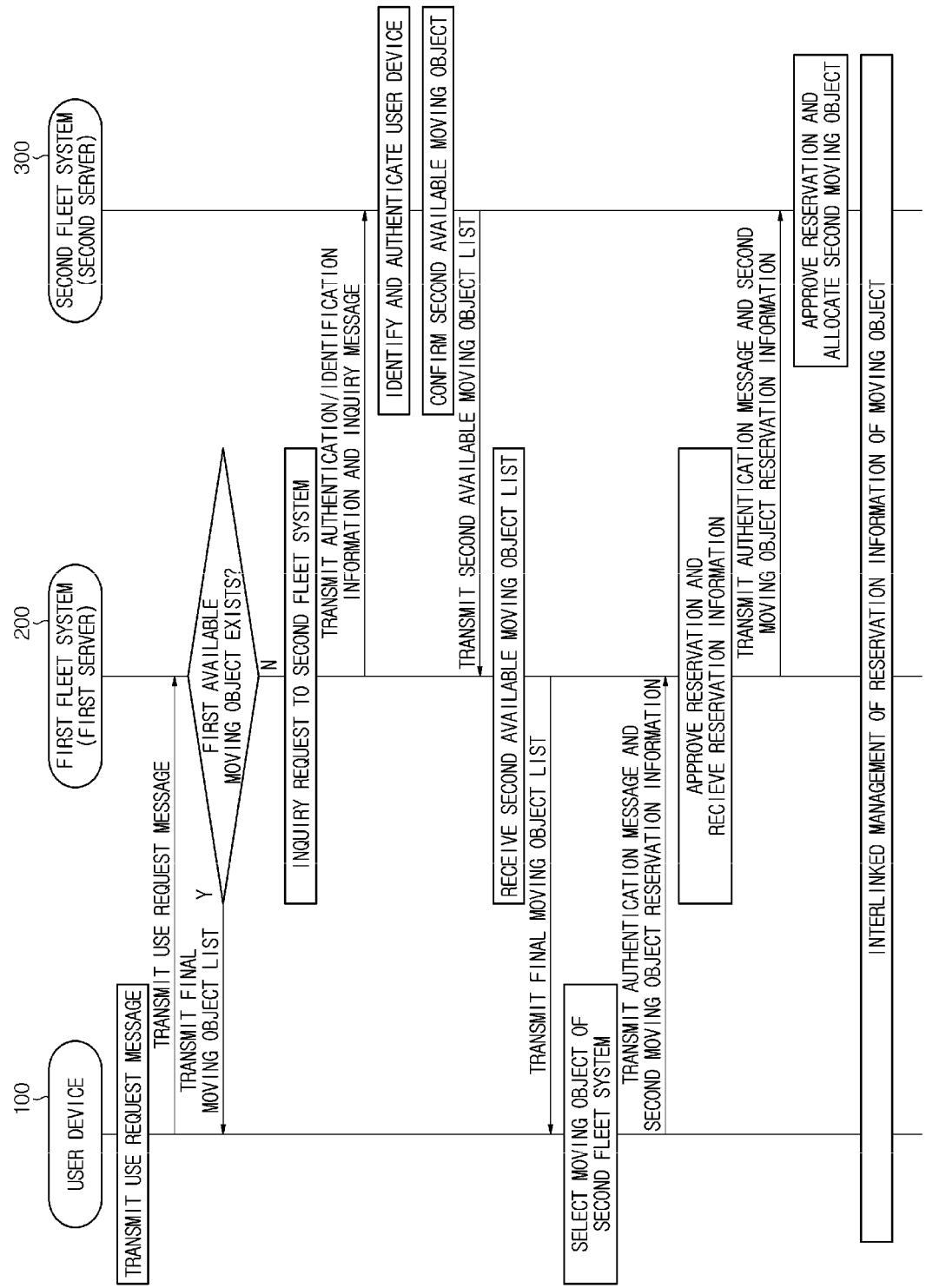
FIG. 7 is a flowchart illustrating an interlinking method for heterogeneous fleet systems according to another embodiment of the present disclosure.

FIG. 7 is a flowchart illustrating an interlinking method for heterogeneous fleet systems according to another embodiment of the present disclosure.

The embodiment of FIGS. 6A and 6B presents every available moving object of a system corresponding to a use request as a final moving object list without preferred allocation for first and second fleet systems. The embodiment of FIGS. 6A and 6B is useful for a case in which a desired renting point, which is inferred from history information, preference information and use pattern information, is not a first fleet spot but a fleet spot of another system. On the other hand, the embodiment of FIG. 7 is an example of preferring allocation of a first moving object of a first fleet system. When a desired renting point, which is inferred from a user's history information, preference information and use pattern information, is close to a first fleet spot and the user wants a specific type of moving object, the embodiment of FIG. 7 may be effective.

First, the user device 100 may make a use request for a moving object to the first server 220 of the first fleet system 200. The use request may be based on at least moving object use time and be a message making a preliminary request for using a second moving object 400 of the second fleet system 300. The preliminary request may be realized by at least one among policy information of the first fleet system 200, policy information of the second fleet system 300, a detailed request of the user device 100, or the benefit and penalty in the user's rating information.

As the use request may include at least one of the various types of information described in FIGS. 6A and 6B, detailed description will be skipped.

Next, as with FIGS. 6A and 6B, the first server 220 may check whether or not there is a first available moving object corresponding to the use request, and in case there is the first available moving object, the first server 220 may write the first available moving object as a final moving object list and present the list to the user device 100. The user device 100 may select a first moving object from the final moving object list and may transmit reservation information to the first server 220. As with FIGS. 6A and 6B, the first server 220 may allocate the first moving object according to the reservation information and manage the reservation information. When reservation of the first moving object is completed, the first server 220 may not transmit a use inquiry message based on the use request to the second server 320.

In case there is no first available moving object, the first server 220 may transmit a use inquiry message to the second server 320. The second fleet system 300, to which the use inquiry message is transmitted, is actually the same as in FIGS. 6A and 6B.

In addition, the first server 220 may transmit at least one among authentication information of the first fleet system 200, identification information of the user device 100, or identification information of a heterogeneous user, to the second server 320 of the second fleet system 300. Furthermore, identification and authentication between the first fleet system 200 and the second fleet system 300 may be performed in the actually same manner as described in FIG. 2.

Next, the second server 320 may identify and check, based on at least one of authentication information or identification information, whether or not there is restriction on access of the first fleet system 200 and the user device 100. As a result of checking, when access is permitted, the second server 320 may authenticate the first fleet system 200 and the user device 100.

Next, the second server 320 may check whether or not there is a second available moving object corresponding to a use inquiry message. Based on the use request, the use inquiry message may include, along with use time, the above-described information included in the request, for example, at least one of location information, type information of a moving object, history information, preference information, rating information or use pattern information. The existence of the second available moving object is checked in the actually same process as the process of FIGS. 6A and 6B for searching for the first available moving object corresponding to the use request.

When there is a second available moving object corresponding to a use inquiry message, the second server 320 may generate a second available moving object list based on the second available moving object, and may transit the list to the first server 220.

When the second available moving object corresponding to the use inquiry message does not exist, the second server 320 may transmit a non-provision message to the first server 220. An example of transmitting the non-provision message may be the case described in FIGS. 6A and 6B. When the non-provision message is transmitted, the first server 220 may transmit a non-provision message of first and second moving objects to the user device 100.

Next, the first server 220 may generate a final moving object list by receiving a second available moving object list and may transmit the list to the user device 100. The user device 100 may select and reserve a second moving object in the final moving object list.

When the user device 100 selects the second moving object, the first server 220 may receive reservation information of the second moving object and a message requesting to authenticate the reservation of the second moving object and may transmit the reservation information and the message to the second server 320. The reservation authentication message may include at least one of identification information of the user device 100 or identification information of a heterogeneous user, along with reservation authentication information of the first fleet system 200. The second server 320 may confirm and verify the reservation authentication message and reservation information, finally approve a first user's reservation of a second moving object, and allocate the reserved second moving object.

Next, the first server 220 and the second server 320 may share reservation information and authentication processing information with each other and may interlink and manage relevant information until processing the end of use.

The embodiment according to FIG. 7 shows an example in which a user subscribing to the first fleet system 200 interlinks with and uses the second fleet system 300. However, the present disclosure is not limited to the embodiment, and the description above may be applied to another embodiment in which a user subscribing to the second fleet system 300 interlinks with and uses the first fleet system 200.

Figure 8:
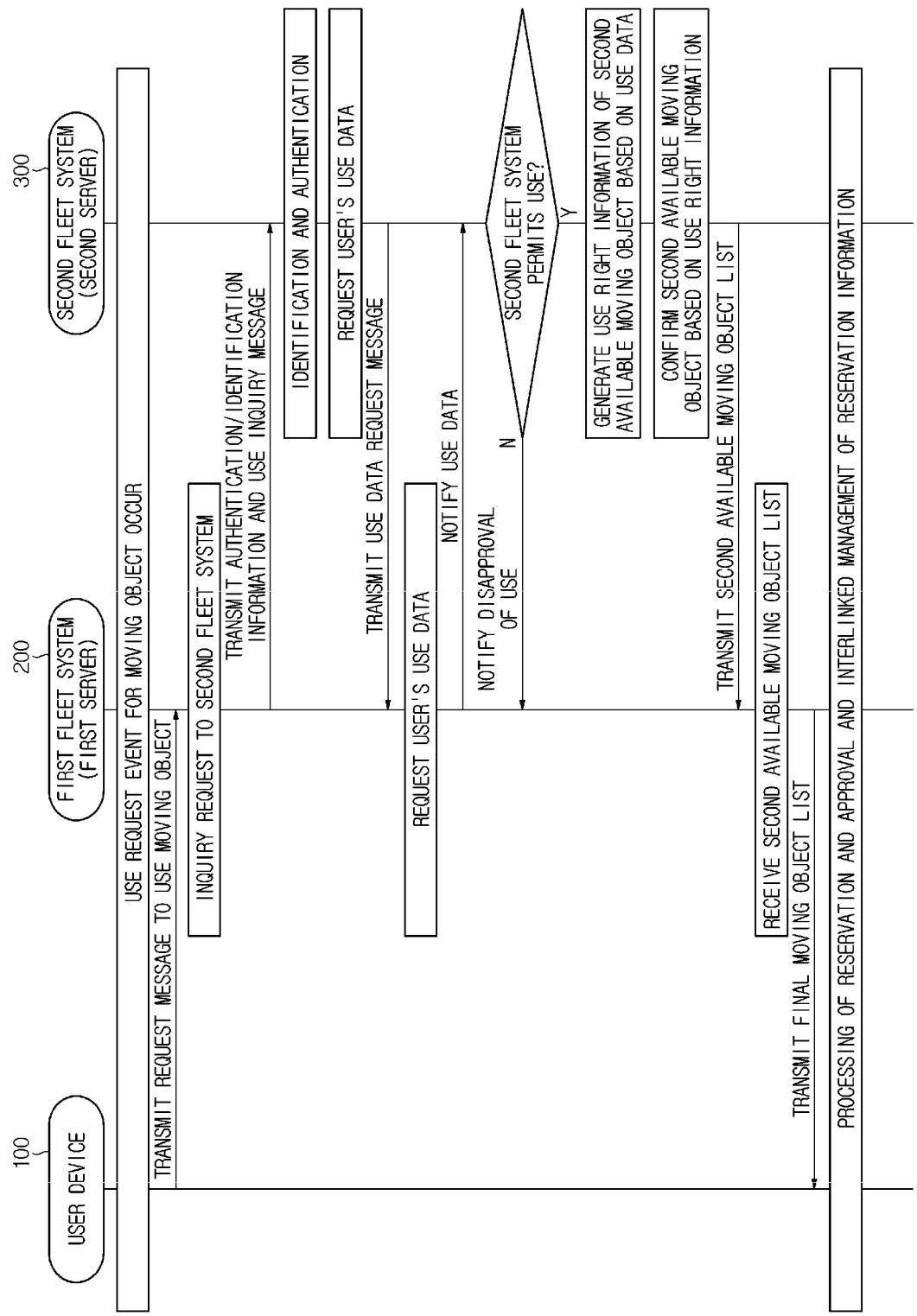
FIG. 8 is a flowchart illustrating an interlinking method for heterogeneous fleet systems based on use authority information in a second fleet system, as another embodiment of the present disclosure.

FIG. 8 is a flowchart illustrating an interlinking method for heterogeneous fleet systems based on use authority information in a second fleet system, as yet another embodiment of the present disclosure.

First, an event of moving object use request may occur. Like in FIG. 6 or FIG. 7, the event may be a process related to use request to the first server 220 and generation of a first available moving object list.

Next, as with FIGS. 6A and 6B, the first server 220 may transmit a use inquiry message to the second server 320. In addition, the first server 220 may transmit at least one among authentication information of the first fleet system 200, identification information of the user device 100, or identification information of a heterogeneous user, to the second server 320 of the second fleet system 300. Furthermore, identification and authentication between the first fleet system 200 and the second fleet system 300 may be performed in the actually same manner as described in FIG. 2.

Next, the second server 320 may identify and check, based on at least one of authentication information or identification information, whether or not there is restriction on access of the first fleet system 200 and the user device 100. As a result of checking, when access is permitted, the second server 320 may authenticate the first fleet system 200 and the user device 100.

Next, the second server 320 may request use data of a user to the first server 220. The use data may be at least one among the user's rating information provided by the first fleet system 200, benefit and penalty information according to the rating information, or use status information and evaluation information constituting the rating information. Rating information, benefit/penalty information and evaluation information may be generated by additionally considering evaluation data based on heterogeneous fleet information according to the use of a moving object of a non-subscribed fleet system. When a use request already includes rating information and the second server 320 requests only the rating information as use data, the second server 320 may skip requesting the use data.

As rating information and evaluation information are based on data of every fleet system, the second server 320 may request separately heterogeneous fleet information as use data so that a user's use status in utilizing a non-subscribed fleet system may be confirmed. In this case, the use data may be at least one of heterogeneous fleet information related to the second fleet system 300, which authenticates the device 100, or heterogeneous fleet information related to a non-subscribed fleet system.

Next, according to a type of use data requested by the second server 320, the first server 220 may extract use data from user information and transmit the use data to the second server 320.

When the type of use data is a rating level according to rating information in the first fleet system 200 and benefit/penalty information according to the level, the first server 220 may transmit rating levels and benefit/penalty information shown in FIG. 9 and FIG. 10 to the second server 320.

FIG. 9 is a view illustrating an example of rating information in a first fleet system, and FIG. 10 is a view illustrating an example of benefit and penalty according to rating information in a first fleet system.

Referring to FIG. 9, at the time of an initial or renewed contract, use status information may consider a term of contract like a short term, a midterm and a long term or may consider use performance of a moving object irrespective of the term of contract. Evaluation information may be generated based on cleanliness after use of a moving object, occurrence of maintenance due to an accident and an improper use of the moving object, and a drastic increase in the degree of wear for components of the moving object due to a user's poor use like sudden stop/speeding. Evaluation information may be produced or estimated by a subsequent user or a maintenance center after the return of a moving object or from the above-described elements sensed by various sensors during/after use which are installed in the moving object. A rating level thus determined may be a discrete rating according to zones, as in FIG. 9, or be assigned as a concrete score. Meanwhile, a user with low level may improve evaluation through continuous fine use or may raise his rating level through payment of upgrading fee.

As shown in the benefits and penalties according to rating levels in FIG. 10, the server 200 may allocate moving objects in a whole range from top-class to low-class specifications to a user with top rating level of S. For example, when there is a use request in which a user designates use time and location information, the first server 220 may set a moving object with a predetermined rating from top-class specification to be included in an available moving object list among available moving objects at the use time. For example, when there is no best specification at use time, it may be determined that moving objects rated next with top-class and middle-class specifications are to be included in the available moving object list. In addition, when there is a use request in which a user corresponding to the rating level of S designates use time and location information, the first server 220 may present a moving object satisfying as many benefit conditions as possible of age, cleanliness and allocation zone, which are illustrated in FIG. 10, among moving objects with best and top-class specifications. In addition, according to rating levels, returning a first moving object to a fleet spot different from an allocation spot at time of use request or during use may be permitted. The different fleet spot may be a fleet spot, which belongs to the first fleet system 200 but did not allocate, or a fleet spot of a non-subscribed fleet system.

In addition, the first server 220 may limit some of benefits enjoyable at a current rating level by imposing a penalty for a user's poor use and may lower the rating level when the poor use is accumulated. As described in FIG. 9, rating levels may be lowered due to degradation of cleanliness of a moving object, occurrence of maintenance caused by a user's poor use, an increase in the degree of wear caused by the user's severe use, and the like. However, when the first server 220 determines a user's poor use, if a degree of idleness such as a time and expense of maintenance work for a moving object, which are caused by the occurrence of maintenance is equal to or lower than a predetermined value, the application of penalty may vary according to rating levels. In addition, when cleanliness degradation and a degree of wear of components are below a reference value, the application of penalty may vary according to rating levels. That is, in case of a user's slightly poor use, as shown in FIG. 10, the server 200 may apply a penalty according to rating levels. As another example, when poor use of a moving object occurs due to a user's mistake, a penalty may be set to be applied irrespective of rating levels.

Rating information for determining benefit/penalty information may be generated and updated by considering not only evaluation information according to the use of a first moving object but also heterogeneous fleet information according to the use of a moving object of a non-subscribed fleet system and evaluation information of another system.

In addition, the first server 220 may further add permission information related to a use permission range of a moving object of a non-subscribed fleet system as benefit information, in accordance with each rating level of user. For example, as in FIG. 10, permission information may be whether or not another fleet moving object is available, a use region range of another fleet moving object, whether or not returning to another fleet spot is possible, whether or not to apply a minimum charge of use. The benefit of return to another spot may be to return a moving object to a fleet spot of a fleet system different from an allocated system. The benefit of minimum charge of use may be a case in which a fee imposed on a user using a moving object of a non-subscribed fleet system may be calculated to be lower of the first fleet system and the non-subscribed system.

The another fleet system related to the permission information may be commonly applied to any non-subscribed fleet system. As another example, the permission information may be differently set according to each of a multiplicity of non-subscribed fleet systems. For example, as for moving objects of an associate fleet system, rating levels from S to B may be available, but as for moving objects in a fleet system of a simple open type, only rating levels of S and A may be available.

Next, the second server 320 may receive a user's use data from the first server 220 and may check, based on the use data, whether or not the user's use is permitted for the second fleet system 300. When the use data is rating information, the second server 320 may recognize rating information of the first fleet system 200 as it is, or the use data may be transformed to unique data related to evaluation of the second fleet system 300 alone by using a matching table corresponding to the rating information. When a user's benefit/penalty information is included in use data, a user with rating level of C, which is shown in FIG. 10, has permission information not permitting the use of another fleet moving object. Based on the permission information, the second server 320 may prohibit the use of a user with rating level of C. When the use data is utilization status information of a heterogeneous moving object, which is included in a user's heterogeneous fleet information received from the first server 220, and the user's use information, the second server 320 may determine whether or not to use the second fleet system 300, based on poor use history of a heterogeneous moving object and evaluation information. In addition, the second server 320 may check the user's history of using the second fleet system based on the heterogeneous fleet information. When there is a history of using a second moving object, the second server 320 may determine whether or not to permit the use of the second fleet system 300, based on the heterogeneous user's evaluation information generated by use.

When the second server 320 does not permit the user to use based on the use data, the second server 320 may notify a message of disapproval of use to the user device 100 via the first server 220.

When the second server 320 permits the user to use, use authority information of a second available moving object may be generated based on use data. When use data is the user's permission information shown in FIG. 10, the second server 320 may determine a use permission range of a second moving object corresponding to the user's rating level. For example, when the user corresponds to the rating level of B, the second server 320 may set a use region range, in which a second moving object may be driven, to a regional range set in the second fleet system 300, for example, a predetermined distance range of a second fleet spot. In addition, the second server 320 may disapprove return to a fleet spot of another system, for example, to a first fleet spot so that the second moving object may be returned to a second fleet spot. Also, when the user corresponds to the rating level of B, the second server 320 may limit use authority information to a second moving object corresponding to middle to low class vehicle specifications and level A of cleanliness based on the benefit/penalty information shown in FIG. 10. The above description shows that use authority information is generated based on benefit information and permission information received from the first fleet system 200. As another example, the second fleet system 300 may give a benefit and permission range with a lower level than the first fleet system 200 to a user corresponding to rating level of B according to separate policy information. On the other hand, the second fleet system 300 may provide a high level of benefit and permission range. When the use data is at least one of heterogeneous fleet information or evaluation information according to the use of a second moving object, the second server 320 may generate use authority information in a unique method based on the information.

The second server 320 may search for a second available moving object based on the use right information. When the use authority information is generated based on the benefit/penalty information and permission information shown in FIG. 10, the second server 320 may write a second available moving object list including a second moving object corresponding to middle to low class vehicle specifications and level A of cleanliness for a user with rating level of B. Also, the second server 320 may add a restriction on the use region range and return range of the second moving object to the second available moving object list.

The second server 320 may transmit the second available moving object list to the first server 220, and the first server 220, like FIG. 6 or FIG. 7, may transmit a final moving object list including a moving object, which belongs to at least one of the first available moving object list or the second available moving object list, to the user device 100.

Next, processing of reservation and approval and interlink management of reservation information are performed, and the events of processing and management may proceed in the actually same manner as FIG. 6 or FIG. 7.

Figure 11:
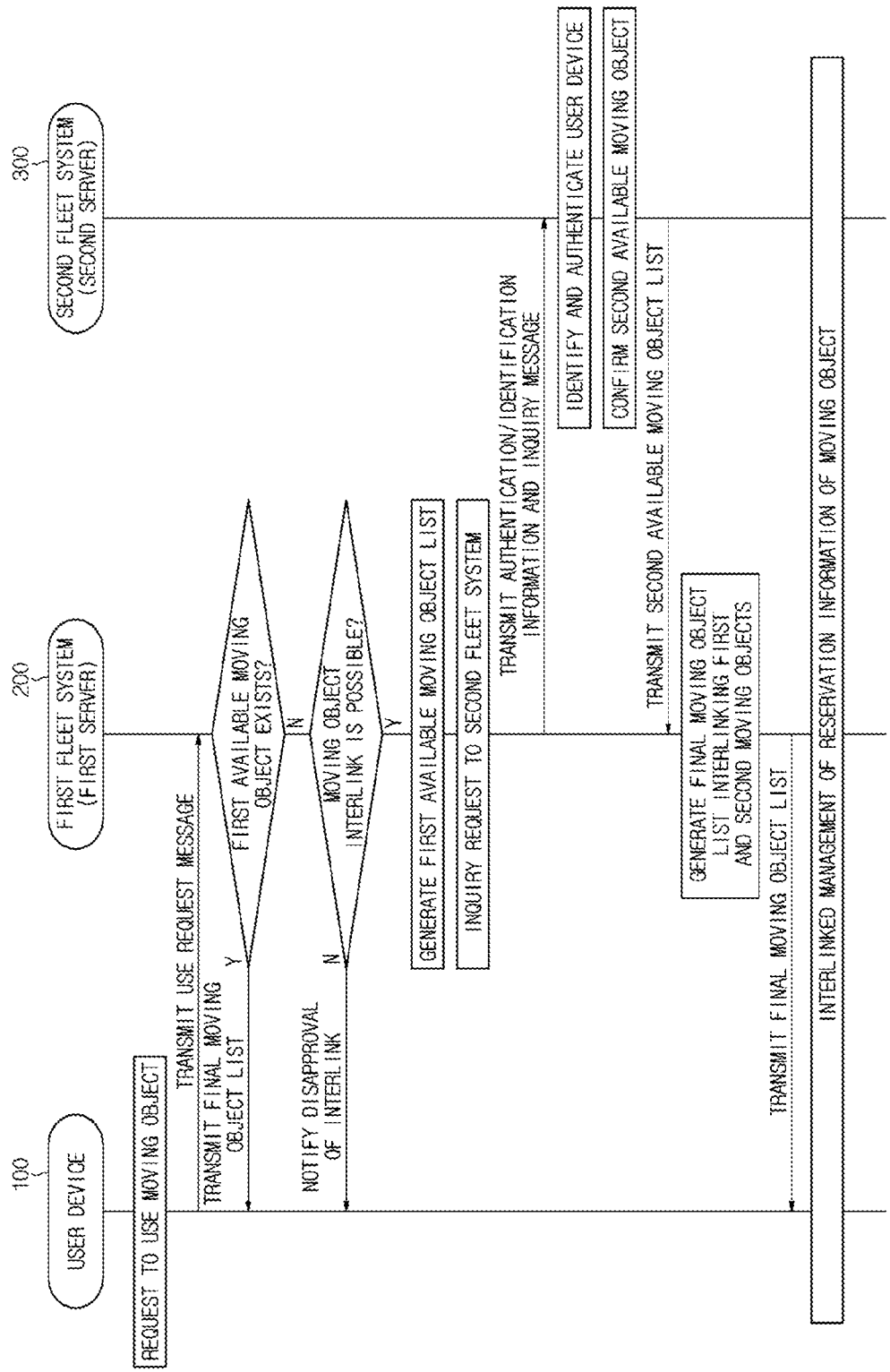
FIG. 11 is a flowchart illustrating an interlinking method for heterogeneous fleet systems which provides a moving object list by connecting moving objects of first and second fleet systems, as yet another embodiment of the present disclosure.

FIG. 11 is a flowchart illustrating an interlinking method for heterogeneous fleet systems which provides a moving object list by connecting moving objects of first and second fleet systems, as yet another embodiment of the present disclosure.

First, the user device 100 may make a use request for a moving object to the first server 220 of the first fleet system 200. The use request may be based on at least moving object use time and be a message making a request for using a first moving object and a second moving object 400.

As the use request may include at least one of the various types of information described in FIGS. 6A and 6B, the use request may include, for example, a request for a specific type and class of moving object based on at least one of specific type information for a moving object, history information, preference information or use pattern information. In addition, the use request may include a connection request for first and second available moving objects at a request of the user device 100 or due to a setting of the first server 220. Even when the connection request is included, the first fleet system 200 and the second fleet system 300 may provide a moving object list based on a single fleet system, as shown in FIG. 6 and FIG. 7. Specifically, the first fleet system 200 and the second fleet system 300 may provide a moving object list consisting of a combination of first and second available moving objects to the user device 100, together with moving object lists consisting of the first and second available moving objects respectively. In FIG. 11, for the convenience of explanation, the description will focus on an example of providing a list consisting of a combination of first and second available moving objects. However, a final moving object list in FIG. 11 may include a first available moving object or a second available moving object, which may be provided alone.

Next, as with FIGS. 6A and 6B, the first server 220 may check whether or not there is a first available moving object corresponding to the use request, and in case there is the first available moving object, the first server 220 may write the first available moving object as a final moving object list and present the list to the user device 100. The user device 100 may select a first moving object from the final moving object list and may transmit reservation information to the first server 220. As with FIGS. 6A and 6B, the first server 220 may allocate the first moving object according to the reservation information and manage the reservation information. When reservation of the first moving object is completed, the first server 220 may not transmit a use inquiry message based on the use request to the second server 320.

In case there is no first available moving object, the first server 220 may determine whether or not cooperation between the second fleet system 300 and a moving object is possible.

For example, the absence of the first available moving object may be a case in which a first moving object, which the first fleet system 200 may provide, satisfies only a part of requested use time or no first moving object can be provided which satisfies a requested type and class (type information). For example, although location information of a user, who is going to use, is near a first fleet spot and the user wants to use a first moving object satisfying use time or type information, the fleet system 200 is not capable of providing the first moving object satisfying the user.

Moving object connection may mean that a user links and uses first and second moving objects during use time. The user may use either of the first and second moving objects first, park the moving object at another fleet spot, which did not allocate the moving object, and then use the other moving object. In some cases, after returning the other moving object to a corresponding fleet spot, the user may return the moving object, which the user used first, to a fleet spot that allocated the moving object.

Whether or not moving object connection is possible may be determined based on whether or not a connection service is permitted in the first and second fleet systems 200 and 300 and based on benefit/penalty information according to a user's rating information.

When the first server 220 determines that moving object connection is impossible, the first server 220 may notify a connection disapproval message to the user device 100. In addition, as with FIG. 6 and FIG. 7, the first server 220 may transmit a use request message to the second server 320, and the second server 320 may provide a second available moving object list corresponding to the use request message to the user device 100 via the first server 220. When there is not a second available moving object corresponding to the use request message, the first server 220 may deliver a non-provision message to the user device 100.

When the first server 220 determines that moving object connection is possible, the first server 220 may search for a first available moving object corresponding to a part of use time and/or type information of the moving object, which is included in a use request. When the first available moving object is found, the first server 220 may generate a first available moving object list based on the first available moving object that is partially satisfactory. For example, when the user device 100 requests to use a large-sized sedan with excellent cleanliness from 10 AM to 5 PM, if a first moving object, which is a small-sized sedan and is available from 10 AM to 5 PM, is found in the first server 220, the moving object may be adopted as a first available moving object. The first server 220 may generate a first available moving object list consisting of the first available moving object thus adopted. In addition, the first server 220 may add whether or not the first available moving object can be returned to or parked at another fleet spot, for example, a second fleet spot, to the first available moving object list, based on at least one of policy information of the first and second fleet systems 200 and 300, a user's rating information or benefit/penalty information.

Next, the first server 220 may transmit a use inquiry message to the second server 320. The use inquiry message may include an inquiry regarding whether or not there is a second moving object corresponding to the remaining part of the use request that the first available moving object fails to satisfy. Also, as with FIG. 6 and FIG. 7, the first server 220 may transmit identification and authentication information.

Next, the second server 320 may identify and check, based on at least one of authentication information or identification information, whether or not there is restriction on access of the first fleet system 200 and the user device 100. As a result of checking, when access is permitted, the second server 320 may authenticate the first fleet system 200 and the user device 100.

Next, the second server 320 may check whether or not there is a second available moving object corresponding to the remaining part of the use inquiry message. Referring to the above-described example, the remaining part of the use request may be actually a request to use a large-sized sedan. When the second server 320 confirms that there is a second moving object which is a large-sized sedan and is available from 11 AM to 5 PM, the second server 320 may include the second moving object in the second available moving object list. Next, the second server 320 may deliver the second available moving object list to the first server 220. When there is no second available moving object corresponding to the remaining part of the use request, the second server 320 may transmit a non-provision message to the first server 220. When the non-provision message is transmitted and neither first nor second available moving object is provided alone, the first server 220 may transmit a non-provision message of the first available moving object and the second available moving object to the user device 100.

Next, the first server 220 may write a combination of the first and second available moving objects corresponding to the use request in the first and second available moving object lists, generate a final moving object list according to the written combination and transmit the final moving object list to the user device 100. Based on the first available moving object list, the final moving object list may indicate whether or not parking or returning the first available moving object to the second fleet spot is permitted. The user device 100 may select and reserve a combination of the first and second moving objects in the final moving object list.

When the user device 100 selects a specific combination, the first server 220 may receive a message requesting reservation information of the first and second moving objects and reservation authentication of the first and second moving objects. The first server 220 may transmit a message requesting reservation information and authentication of the second moving object to the second server 320. A reservation authentication message is actually the same as in the process of FIG. 6 and FIG. 7.

Next, the first server 220 and the second server 320 may share reservation information and authentication processing information with each other and may interlink and manage relevant information until processing the end of use.

The embodiment according to FIG. 11 shows an example in which the second fleet system 300 provides a supplementary second moving object when the first fleet system 200 does not satisfy a part of a use request. As another embodiment, when the use request is preferred use of a moving object of the second fleet system and the first fleet system 200 provides a supplementary first moving object, the embodiment according to FIG. 11 may be similarly applied. Specifically, when there is no available moving object corresponding to the use request in the second fleet system 300, it may be checked whether or not connection between available moving objects belonging to the first and second fleet systems 200 and 300 is possible. When the connection is possible, a second available moving object list may be generated to include a second available moving object that may be parked at a fleet spot of the first fleet system, and a final moving object list may be presented as a combination of available moving objects belonging to the first and second fleet systems 200 and 300.

Figure 12A:
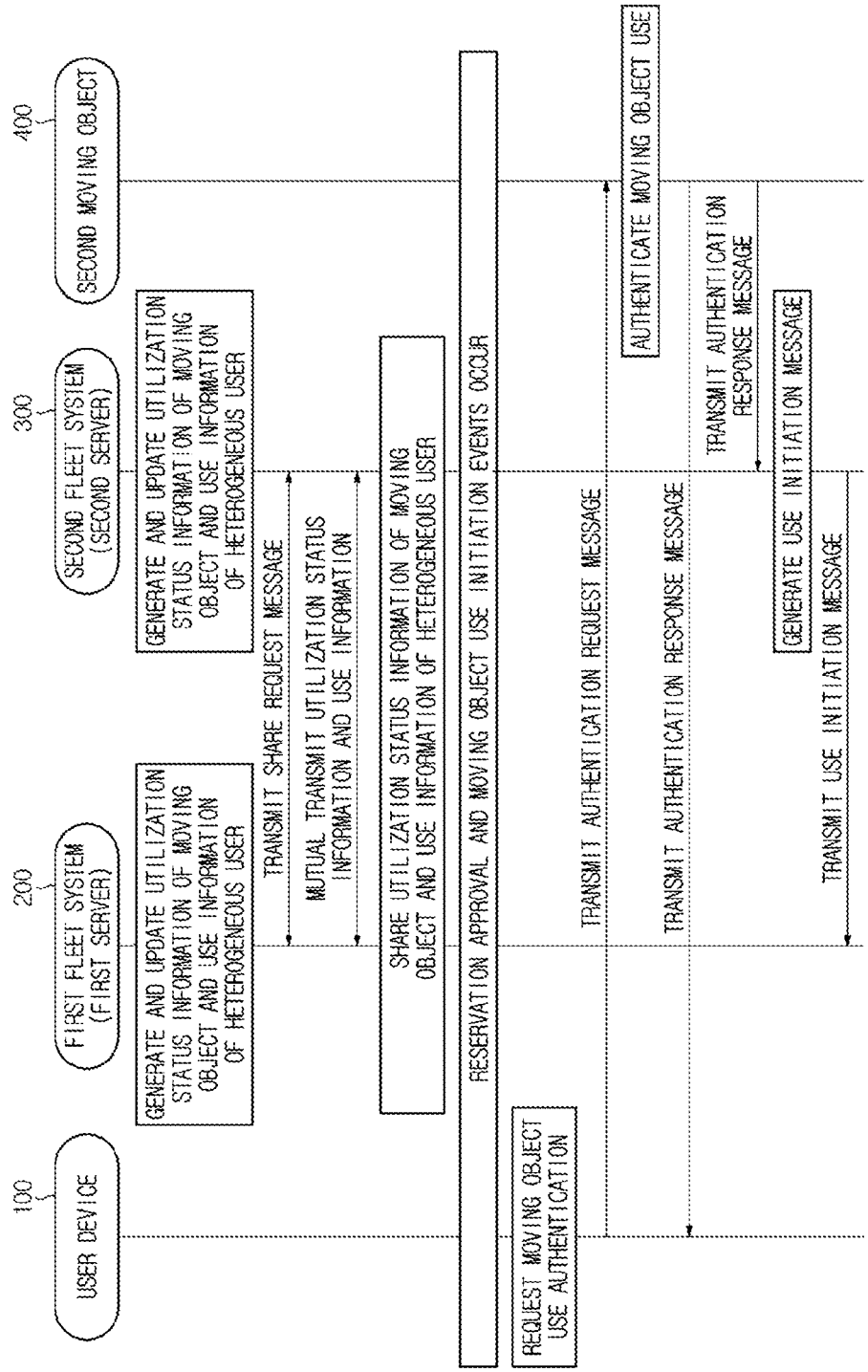
FIGS. 12A and 12B are flowcharts illustrating a management process according to use of a moving object of a second fleet system.
Figure 12B:
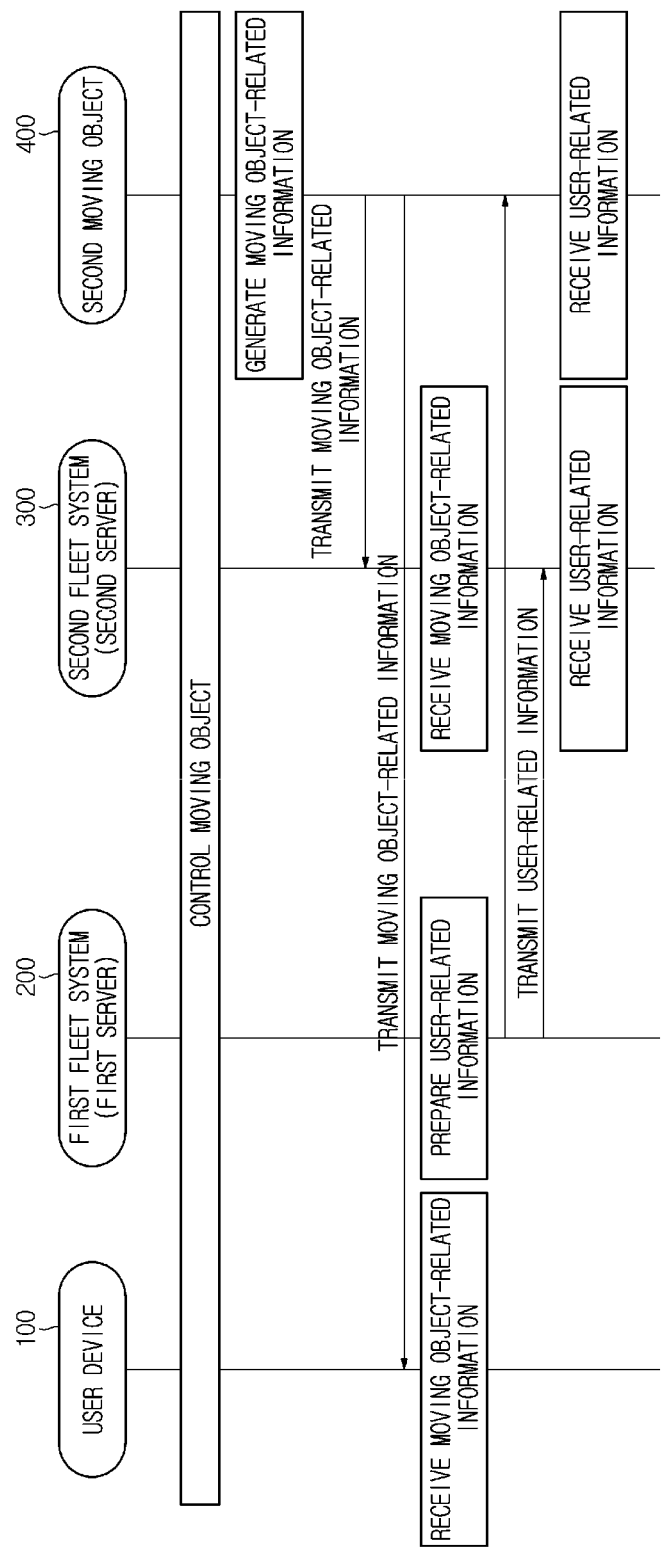

FIGS. 12A and 12B are flowcharts illustrating a management process according to use of a moving object of a second fleet system.

When the first and second fleet systems 200 and 300 are connected by cooperation service information, the first and second servers 220 and 320 may generate utilization state information of a moving object based on a heterogeneous user's use of moving object in each fleet system, record the utilization state information as heterogeneous fleet information and update the utilization state information whenever a same moving object is used. For example, a heterogeneous user may mean a first user using a second moving object, as described above. The utilization state information may include use time of the moving object, a travel route, and data regarding whether or not the moving object is poorly used. The first and second servers 220 and 320 may generate use information according to each heterogeneous user and record the use information as heterogeneous fleet information. When a heterogeneous user uses the second fleet system 300, the use information may be updated. For example, the use information may include type information associated with a class and age of a heterogeneous moving object used by the user, location information at time of use request or at expected time of use, a travel route including a waypoint and a destination point, consumption information during use, fellow passenger-related information, and evaluation information on the use of a heterogeneous moving object.

Each fleet system 200 and 300 may transmit a request message sharing utilization status information and use information constituting heterogeneous fleet information. Each fleet system 200 and 300 receiving the message may transmit and share its own heterogeneous fleet information.

Meanwhile, based on reservation information according to FIGS. 6 to 8, and FIG. 11, when a user subscribing to the first fleet system 200 starts using a second moving object, the user device 100 may request use authentication to the second moving object 400. A message related to the authentication request may include identification and authentication information of the user or the user device in order to match reservation information stored in the second server 320. Thus, when the second moving object 400 verifies that the identification and authentication information is normal, the second moving object 400 may release its lock and transmit an authentication response message to the user device 100. In addition, the second moving object 400 may transmit the authentication response message to the second server 320, and the second server 320 may generate a use start message and transmit, to the first server 220, a message to the effect that the user has started using the second moving object 400. As another embodiment, the second moving object 400 may verify the user's identification and authentication information through the user's identification device used in the first fleet system 200.

When the user drives and controls the second moving object 400, the second moving object 400 may generate information associated with the second moving object 400, which occurs during the control of the moving object, and transmit the information to the second server 320 and the user device 100. The information associated with the second moving object 400 may be information of the current location of the moving object, a waypoint, a parking point, a residual amount of fuel or battery, and a failure state of main component of the moving object.

The first server 220 may transmit the user-related information to the second server 320 and the second moving object 400. The user-related information may include the history information, preference information, rating information and use pattern information that are illustrated in FIG. 3. The second moving object 400 may provide a necessary service to the user based on the user-related information. In addition, based on rating information and benefit/penalty information, the second moving object 400 may control a use region range and return to another fleet spot. For example, when the user uses the second moving object 400 exceeding the above-described permission range, the second moving object 400 may deliver a disapproval message to the user or the user device 100 or retrieve control right from the user. During use or after the end of use, moving object-related information, which is accumulated by using the second moving object 400, and the user's use information, which is newly generated, may be transmitted to the second server 320 and be stored as heterogeneous fleet information. In addition, the second server 320 may deliver the heterogeneous fleet information to the first server 220 for the purpose of management in the first server 220, and the first server 220 may update at least one of history information, preference information, rating information or use pattern information based on the heterogeneous fleet information.

Figure 13:
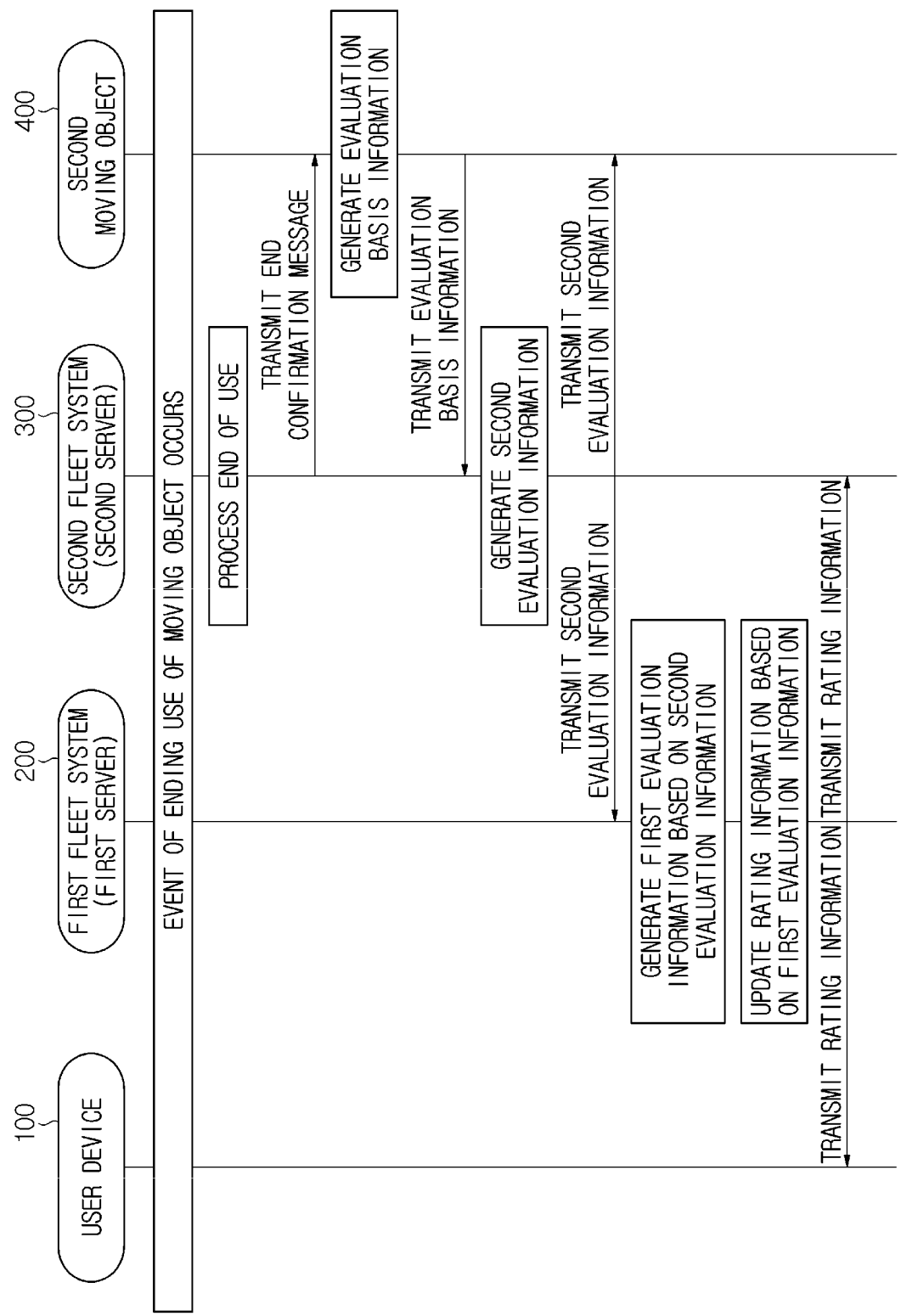
FIG. 13 is a flowchart illustrating an evaluation process according to use of a moving object of a second fleet system.

FIG. 13 is a flowchart illustrating an evaluation process according to use of a moving object of a second fleet system.

First, when finishing the use of the second moving object 400, the user device 100 may transmit a use end request message for the second moving object 400 to the second moving object 400 and the second server 320. The second server 320 may notify an end confirmation message to the second moving object 400 according to the end request message. Receiving the end confirmation message, the second moving object 400 may generate evaluation basis information. For example, the evaluation basis information may include at least one among severe use data of the second moving object 400, after-use cleanliness data of the second moving object 400, after-use maintenance data of the second moving object 400, after-use accident data, or evaluation data of a subsequent user. Data of the evaluation basis information may be detected or recorded by a sensor installed in the second moving object 400, by a camera and based on maintenance data delivered from a maintenance control server. In the present embodiment, the evaluation basis information is described to be generated in the second moving object 400. However, the user device 100 may also generate evaluation basis information like transmission of state image data of the second moving object 400 after spontaneous cleaning measure, quick payment processing due to maintenance and the like and may transmit the information to the second server 320.

Based on the evaluation basis information, the second server 320 may generate second evaluation information and transmit the second evaluation information to the first server 220 and the second moving object 400.

Receiving the second evaluation information, the first server 220 may generate first evaluation information based on the second evaluation information. Since the first evaluation information is illustrated by the example of FIG. 3, a detailed description will be skipped. When the second evaluation information has the same evaluation item and system as in the first evaluation information, the first evaluation information may be generated by being transformed to the items and evaluation system of the first fleet system 200 through an evaluation matching table between the systems.

The first server 220 may determine whether to maintain or change the user's rating information based on evaluation information and use status information on a use condition of a moving object and may update the rating information according to a result of the determination. For example, use status information may include a user's contract information registered in a fleet system. Contract information may include not only a term of subscription and long-term deposit but also specific request information for quickly dissolving the suspended use of a poorly used moving object, such as cleanliness, maintenance and other fast-treatment subscription information.

The first server 220 may transmit updated rating information to the user device 100 using the second moving object 400 and the second server 320, and the first and second servers 220 and 320 may determine whether or not the user has a limitation in using the second fleet system 300 accordingly.

Figure 14:
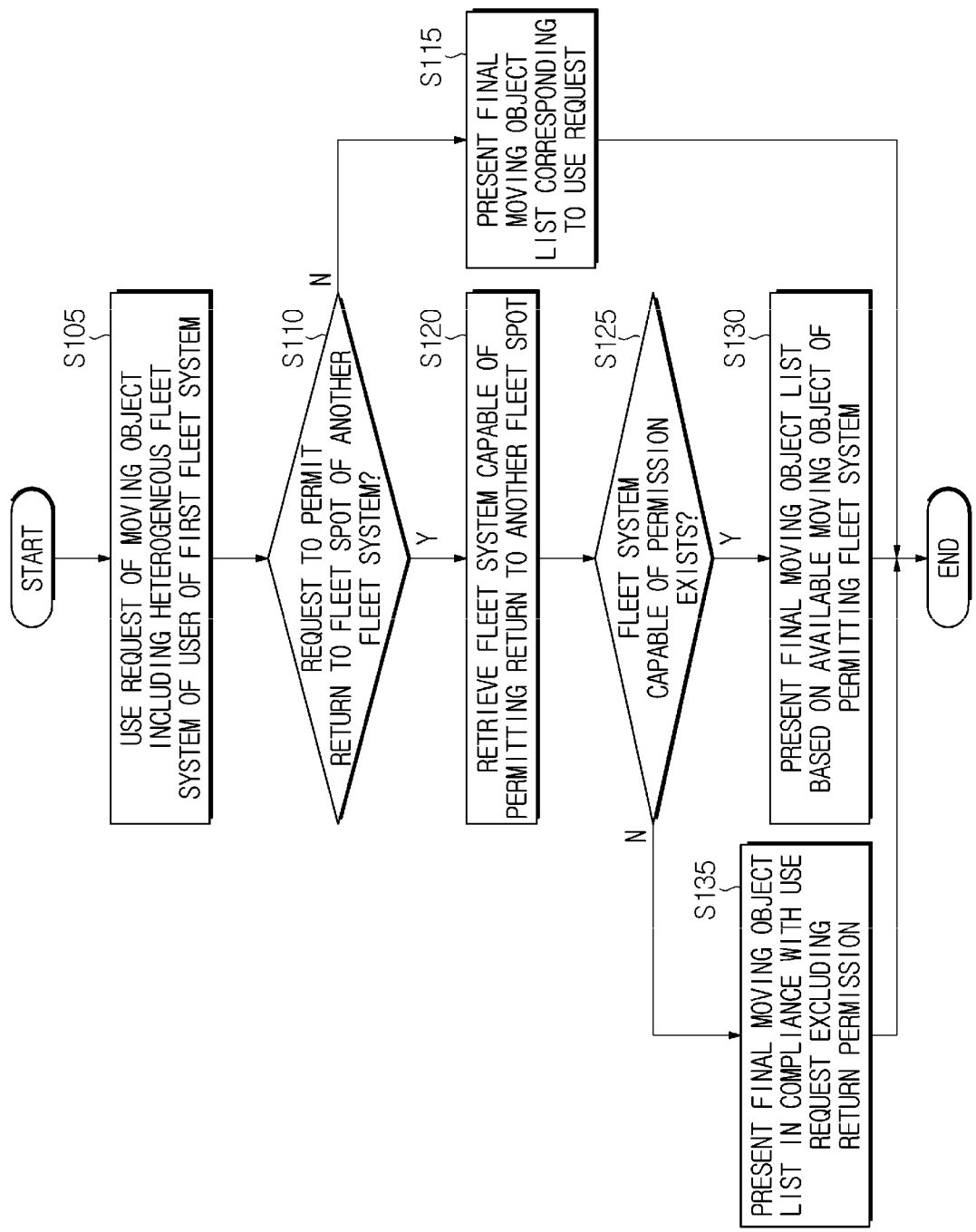
FIG. 14 is a flowchart illustrating a method for processing a use request asking an allocation fleet spot and a return fleet port that are different from each other.

FIG. 14 is a flowchart illustrating a method for processing a use request asking an allocation fleet spot and a return fleet port that are different from each other.

The first server 220 may receive a use request including the use of a moving object of a non-subscribed heterogeneous fleet system from the user device 100 subscribing to the first fleet system 200 (S105). The use request may include at least one of the pieces of information included in FIGS. 6 to 8 and FIG. 11.

Next, the first server 220 may check whether or not the use request includes permission of return of a moving object to a fleet spot of a fleet system different from a fleet system allocating the moving object (S110). For example, a use request related to permission of return to a different fleet spot may be a message that designates target location information of return or the different fleet spot or requests the potential possibility to return to the different fleet spot without designating the target location information of return.

Next, in case the use request has no request of return permission, the first server 220 and the second server 320 may provide a final moving object list corresponding to the use request to the user device, as in the embodiments of FIGS. 6 to 8 and FIG. 11 (S115).

On the other hand, in case the use request has a request of return permission, the first server 220 may confirm that a user may return a moving object to a different fleet spot, based on the user's rating information and benefit/penalty information, and may search for a fleet system permitting return to a different fleet spot (S120). The fleet system to be searched may include not only a non-subscribed heterogeneous fleet system but also a first fleet system. The first server 220 may transmit a return permission inquiry to a multiplicity of heterogeneous fleet systems and may receive a response message. In this case, at time of request through the user device 100, a fleet system permitting return may be a system having an available moving object satisfying at least one of use time included in the use request, type information of the moving object or return policy information of the system. In addition to this, a heterogeneous fleet system receiving the inquiry may receive at least one of rating information or heterogeneous fleet information from the first server 220 and thus may individually determine whether or not a return permission benefit can be given to the user. A response message may indicate whether or not to permit for the user and whether or not to finally accept the return permission request according to the possession status of available moving objects. When satisfying a condition for the user and an available moving object, a heterogeneous fleet system may transmit, to the first server 220, a permission response message to the effect that the return permission request may be executed. A fleet system incapable of executing the return permission request may transmit a disapproval response message to the first server 220.

When the first server 220 confirms that there is a fleet system capable of permission, after receiving a permission response message or as the first fleet system 200 is capable of permitting return (Y of S125), the first server 220 may receive an available moving object list from the permitting fleet system and generate a final moving object list and present the final moving object list to the user device 100 (S130).

When the first server 220 confirms that there is no fleet system capable of permission, after receiving a disapproval response message from every fleet system or as the first fleet system 200 is incapable of executing return permission (N of S125), the first server 220 may generate and present a final moving object list based on a heterogeneous fleet system corresponding to a use request excluding return permission and an available moving object list received from the first fleet system 200 (S135).

Figure 15:
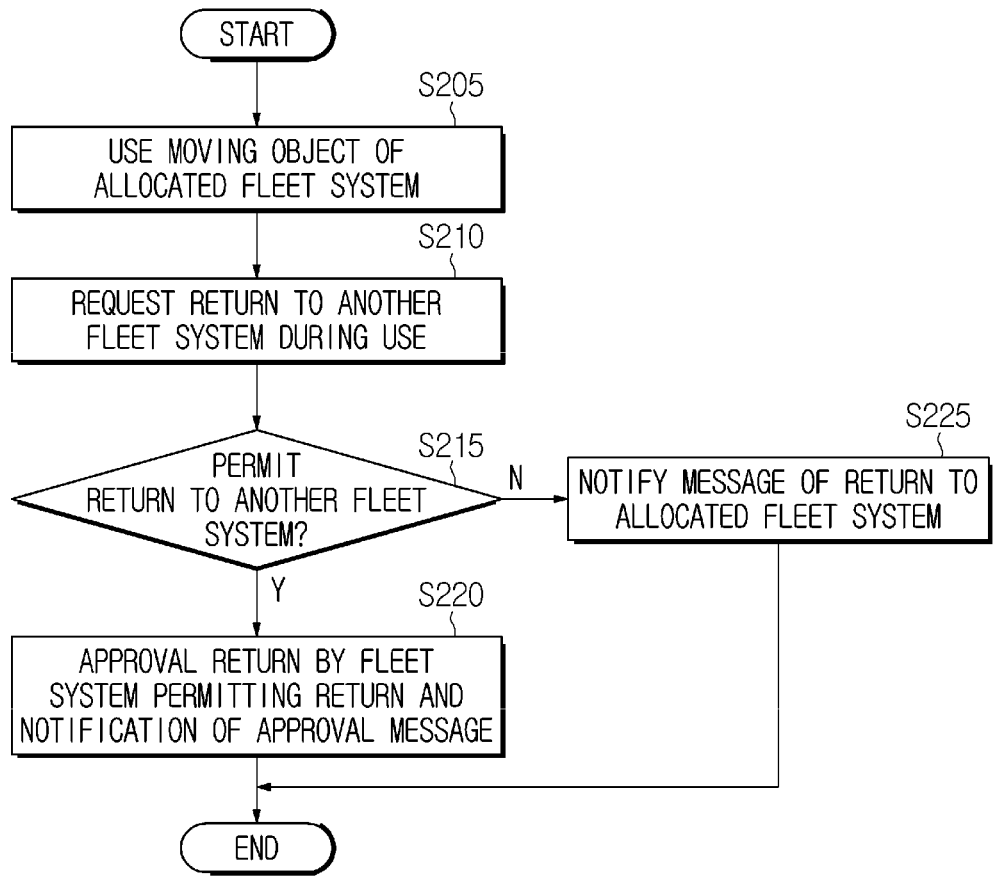
FIG. 15 is a flowchart illustrating a method for processing a request asking a return fleet spot different from an allocation system, while a moving object is being used.

FIG. 15 is a flowchart illustrating a method for processing a request asking a return fleet spot different from an allocation system, while a moving object is being used.

First, a moving object may be allocated to a reserved fleet system by the user device 100 and be used by a user making the reservation (S205).

During the use of the moving object, the user device 100 may receive a return request of a fleet spot of a fleet system different from a fleet system allocating the moving object (S210). The return request of the different spot may be a message that designates the different fleet spot of return or requests the potential possibility to return to the different fleet spot without designating a fleet spot of return.

Next, the allocation fleet system may determine whether or not the user may return the moving object to the different fleet spot, based on return policy information of the allocation system, return policy information of a fleet system to which the return plot belongs, the user's rating information, and benefit/penalty information (S215). In case the allocation fleet system is a system to which the user has subscribed, the subscribed system may extract the user's rating information, benefit/penalty information and return policy information from its storage and may determine whether or not return to the different spot is possible. As another example, in case the allocation fleet system is a non-subscribed heterogeneous fleet system, the heterogeneous fleet system may request and receive the user's rating information, benefit/penalty information and heterogeneous fleet information from a subscribed system. The heterogeneous fleet system may determine whether or not return to the different spot is possible, based on the received information and other information generated by using a moving object of the system, for example, heterogeneous fleet information.

When the allocation fleet system determines permission of return to the different fleet spot, the fleet system may not only approve return but also notify a message approving the return request to at least one of the user device 100 or the moving object (S220).

On the other hand, when the allocation fleet system determines disapproval of return to the different fleet spot, the fleet system may notify a disapproval message requesting return to the allocation system to at least one of the user device 100 or the moving object (S225).

Figure 16:
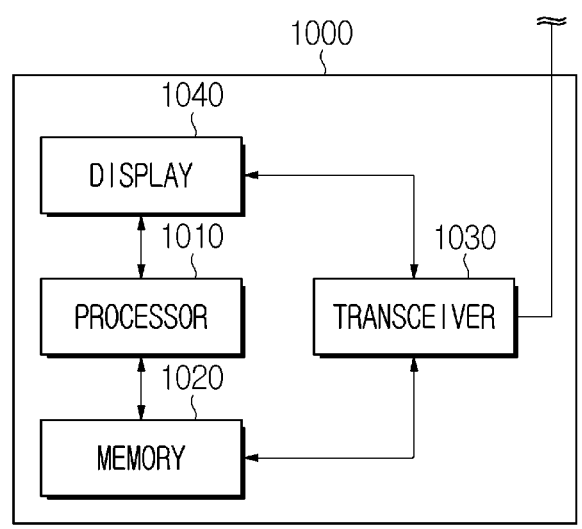
FIG. 16 is a view illustrating an device configuration according to an embodiment of the present disclosure.

FIG. 16 is a view illustrating a device configuration according to an embodiment of the present disclosure. Referring to FIG. 13, an device may include at least one or more among the above-described moving object, a device, each managing server in each of a multiplicity of fleet systems, and an RSU. In other words, the device may communicate and work with another device, which is not limited to the above-described embodiment. As an example, for the above-described operation, an device 1000 may include one or more among a processor 1110, a memory 1120, a transceiver 1130 and a display 1040. That is, the device may include a configuration necessary to communicate with another device or may display a data processing result between each other. In addition, as an example, the device may include other configurations than the above-described configuration. That is, the device may have a configuration, which includes the above-described device for communicating with another device but is not limited thereto, and may be an device operating based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

What is claimed is:

1. A method for interlinking heterogeneous fleet systems implemented by a computing device, the method comprising:
    receiving, by a first fleet system, a use request for a moving object from a user device belonging to the first fleet system;
    transmitting, by the first fleet system, a use inquiry message to at least one second fleet system to which a user does not subscribe when the use request comprises using a moving object of the second fleet system;
    transmitting, by the second fleet system, a second available moving object list corresponding to the use inquiry message to the first fleet system when the second fleet system permits the moving object to be used; and transmitting, by the first fleet system, to the user device a final moving object list comprising a moving object that belongs to at least one of the second available moving object list or a first available moving object list in the first fleet system according to the use request,
wherein the transmitting of the use inquiry message comprises transmitting the use inquiry message to the second fleet system when there is no available moving object corresponding to the use request in the first fleet system but connecting available moving objects belonging to the first and second fleet systems to each other is possible, in order to reduce a processing burden on system resources and network transmission, wherein the available moving objects are connected to each other such that the user can use the available moving objects of the first and second fleet systems by interchanging the available moving objects of the first and second fleet systems,
wherein the first available moving object list is generated to include an available moving object of the first fleet system that is capable of being parked in a fleet spot of the second fleet system, and
wherein the final moving object list is presented as a combination of moving objects belonging to the first and second fleet systems.

2. The method of claim 1, wherein the use inquiry message is generated based on the use request,
wherein the use request is a message that is based on a moving object use time, and
wherein the use request is a message that is generated by comprising at least one among location information of the user, type information of the moving object, history information, preference information, or rating information.

3. The method of claim 2, wherein the transmitting of the second available moving object list comprises generating the second available moving object list and transmitting the second available moving object list to the first fleet system, when the use request comprises at least one of the location information or the type information and a moving object corresponding to at least one of the location information or the type information is searched in the second fleet system.

4. The method of claim 2, wherein the transmitting of the second available moving object list comprises generating the second available moving object list and transmitting the second available moving object list to the first fleet system, when the use request comprises, along with the moving object use time, at least one of the history information or the preference information and a moving object corresponding to at least one of the history information or the preference information is searched in the second fleet system.

5. The method of claim 2, wherein the location information of the user is the user's residence, the user's place of work, location information at a time of the use request, or location information at an expected time of a use of the moving object.

6. The method of claim 2, wherein the history information is propensity information of the user, which is analyzed based on a type of a moving object used by the user, a travel route, a destination point, and a parking spot during a use of the moving object,
wherein the preference information is a type of the moving object that is designated based on the user's preference, and
wherein the rating information has a rating level that is given to the user based on use status information, which comprises subscription information and use performance information for the first fleet system, and after-use evaluation information of the moving object.

7. The method of claim 2, further comprising determining a benefit and a penalty for each user according to the rating information of the first fleet system,
wherein the second available moving object list is generated based on the benefit and penalty of the rating information of the user.

8. The method of claim 7, further comprising generating evaluation information for a moving object belonging to the second fleet system according to the user's use of the moving object,
wherein the second available moving object list is generated based on the rating information and the evaluation information.

9. The method of claim 7, wherein the benefit comprises at least one among a specification, model year and cleanliness of the moving object, a use region of a moving object of the second fleet system, or a return range of the moving object.

10. The method of claim 1, wherein the use inquiry message is generated based on the use request,
wherein the use request is a message that is based on a moving object use time, and
wherein the use request is a message that is generated by further including at least one of the user's life pattern information or riding pattern information of a moving object.

11. The method of claim 10, wherein the life pattern information is generated based on at least one among the user's consumption information, a destination point of a moving object during a past use of the moving object, or a waypoint of a moving object during the past use, and
wherein the riding pattern information is generated based on at least one among an average number of passengers during the past use of a moving object, the passengers' age, the passengers' sex, or the passengers' body information.

12. The method of claim 1, wherein, in case the use request comprises a preferred use of a moving object of the second fleet system, the second available moving object list is generated to include an available moving object of the second fleet system that is capable of being parked in a fleet spot of the first fleet system, when there is no available moving object corresponding to the use request in the second fleet system but connecting available moving objects belonging to the first and second fleet systems to each other is possible, and
wherein the final moving object list is presented as a combination of moving objects belonging to the first and second fleet systems.

13. The method of claim 1, wherein the first fleet system shares use information of a user using a moving object of the second fleet system, and wherein the method further comprises updating, based on the shared use information, at least one of history information, rating information or use pattern information, which constitute the user's use information.

14. The method of claim 1, further comprising:
receiving, by the first fleet system, evaluation information of a user using a moving object of the second fleet system;
updating, by the first fleet system, rating information of the user based on the evaluation information; and
transmitting, by the first fleet system, the updated rating information to the second fleet system.

15. The method of claim 1, wherein the use inquiry message is generated based on the use request, and wherein, when the use request includes a request to permit a return of the moving object to a fleet spot of a fleet system different from a fleet system allocating the moving object, the transmitting of the use inquiry message comprises transmitting the use inquiry message to the second fleet system in which a return to the fleet spot is possible, and wherein the fleet system allocating the moving object is one of the first fleet system and the second fleet system, and the different fleet system is the fleet system that does not allocate the moving object among the first fleet system and the second fleet system, and the fleet spot is a fleet spot of the different fleet system that does not allocate the moving object.

16. The method of claim 1, further comprising:

receiving a return request of a fleet spot of a fleet system different from a fleet system allocating a moving object that is reserved by the user device from the final moving object list; and transmitting a message approving the return request to at least one of the user device or the moving object, when the return request is permitted in the fleet system allocating the moving object and the different fleet system for which the return request is requested, and wherein the fleet system allocating the moving object is one of the first fleet system and the second fleet system, and the different fleet system is the fleet system that does not allocate the moving object among the first fleet system and the second fleet system, and the fleet spot is a fleet spot of the different fleet system that does not allocate the moving object.

17. A server of a first fleet system for a heterogeneous fleet system in which the first fleet system and at least one second fleet system to which a user does not subscribe are interlinked, the server comprising:

a transceiver configured to transmit and receive a signal; and a processor configured to control the transceiver, wherein the processor is further configured to:

receive a use request for a moving object from a user device belonging to the first fleet system, transmit a use inquiry message to the second fleet system, when the use request comprises a use of a moving object in the second fleet system, receive a second available moving object list corresponding to the use inquiry message, when the second fleet system permits the moving object to be used, and transmit to the user device a final moving object list comprising a moving object that belongs to at least one of the second available moving object list or a first available moving object list in the first fleet system according to the use request, wherein the processor is further configured to transmit the use inquiry message to the second fleet system when there is no available moving object corresponding to the use request in the first fleet system but connecting available moving objects belonging to the first and second fleet systems to each other is possible, in order to reduce a processing burden on system resources and network transmission, wherein the available moving objects are connected to each other such that the user can use the available moving objects of the first and second fleet systems by interchanging the available moving objects of the first and second fleet systems, wherein the first available moving object list is generated to include an available moving object of the first fleet system that is capable of being parked in a fleet spot of the second fleet system, and wherein the final moving object list is presented as a combination of moving objects belonging to the first and second fleet systems.

18. A heterogeneous fleet system in which a first fleet system and at least one second fleet system to which a user does not subscribe are interlinked, the heterogeneous fleet system comprising:

a first server and a second server that are configured to manage the first and second fleet systems;

a multiplicity of user devices registered to the first and second fleet systems; and a multiplicity of moving objects registered to the first and second fleet systems, wherein the first server is further configured to:

receive a use request of a moving object from a user device belonging to the first fleet system, transmit a use inquiry message to the second fleet system, when the use request comprises a use of a moving object in the second fleet system, receive a second available moving object list corresponding to the use inquiry message, when the second fleet system permits the moving object to be used, and transmit to the user device a final moving object list comprising a moving object that belongs to at least one of the second available moving object list or a first available moving object list in the first fleet system according to the use request, wherein the first server is further configured to transmit the use inquiry message to the second fleet system when there is no available moving object corresponding to the use request in the first fleet system but connecting available moving objects belonging to the first and second fleet systems to each other is possible, in order to reduce a processing burden on system resources and network transmission, wherein the available moving objects are connected to each other such that the user can use the available moving objects of the first and second fleet systems by interchanging the available moving objects of the first and second fleet systems, wherein the first available moving object list is generated to include an available moving object of the first fleet system that is capable of being parked in a fleet spot of the second fleet system, and wherein the final moving object list is presented as a combination of moving objects belonging to the first and second fleet systems.

* * * * *